US006989915B2

(12) United States Patent
Honjo et al.

(10) Patent No.: US 6,989,915 B2
(45) Date of Patent: Jan. 24, 2006

(54) IMAGE READING APPARATUS FOR OPTICALLY READING IMAGE INFORMATION RECORDED ON SHEETLIKE RECORDING MEDIUM

(75) Inventors: Takashi Honjo, Kawasaki (JP); Tomio Nagai, Nishitama-gun (JP), jpx; Toshiyasu Omata, Akiruno (JP); Hideharu Ito, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 955 days.

(21) Appl. No.: 09/951,379

(22) Filed: Sep. 14, 2001

(65) Prior Publication Data

US 2002/0039208 A1 Apr. 4, 2002

(30) Foreign Application Priority Data

Sep. 21, 2000 (JP) ........................................ 2000-287586
Feb. 28, 2001 (JP) ........................................ 2001-054942

(51) Int. Cl.
*H04N 1/40* (2006.01)
*H04N 1/04* (2006.01)

(52) U.S. Cl. ........................ 358/461; 358/496; 382/274; 399/207

(58) Field of Classification Search ................. 358/461, 358/496, 498, 474, 505; 382/274, 318, 319; 399/207
See application file for complete search history.

(56) References Cited

U.S. PATENT DOCUMENTS

| | | | | |
|---|---|---|---|---|
| 5,101,284 A | * | 3/1992 | Tanabe | 358/461 |
| 5,125,047 A | * | 6/1992 | Ito et al. | 382/321 |
| 5,130,807 A | * | 7/1992 | Tanabe et al. | 358/296 |
| 5,280,368 A | * | 1/1994 | Fullerton | 358/474 |
| 5,329,378 A | * | 7/1994 | Lee | 358/406 |
| 5,579,129 A | * | 11/1996 | Iwata et al. | 358/474 |
| 6,801,670 B2 | * | 10/2004 | Kijima et al. | 382/274 |

FOREIGN PATENT DOCUMENTS

| | | |
|---|---|---|
| JP | 03-191662 | 8/1991 |
| JP | 03-108875 | 11/1991 |
| JP | 04-208935 | 7/1992 |
| JP | 6-164861 | 6/1994 |
| JP | 06-291938 | 10/1994 |
| JP | 07-189856 | 7/1995 |
| JP | 7-113952 | 12/1995 |
| JP | 9-298633 | 11/1997 |
| JP | 10-42111 | 2/1998 |
| JP | 11-112735 | 4/1999 |
| JP | 2002-10040 | 1/2002 |

OTHER PUBLICATIONS

Notification of Reasons for Rejection issued by Japanese Patent Office on Jun. 14, 2005, in Japanese Application No. 2001–054942, and English translation of Notification.

* cited by examiner

*Primary Examiner*—Cheukfan Lee
(74) *Attorney, Agent, or Firm*—Finnegan, Henderson, Farabow, Garrett & Dunner, L.L.P.

(57) ABSTRACT

An image reading apparatus comprises a correcting mechanism for correcting an output signal from a reading unit in accordance with a reference level. The correcting mechanism includes a reference element for setting the reference level and a drive mechanism for rocking the reference element between a first position in which the reference element is advanced to a reading position and a second position in which the reference element is retreated from the reading position. The drive mechanism includes a rotating member that is continuously rotated in one direction. As the rotating member rotates, the reference element rocks between the first and second positions, thereby executing correction of the output signal before image information recorded on a recording medium is read.

23 Claims, 12 Drawing Sheets

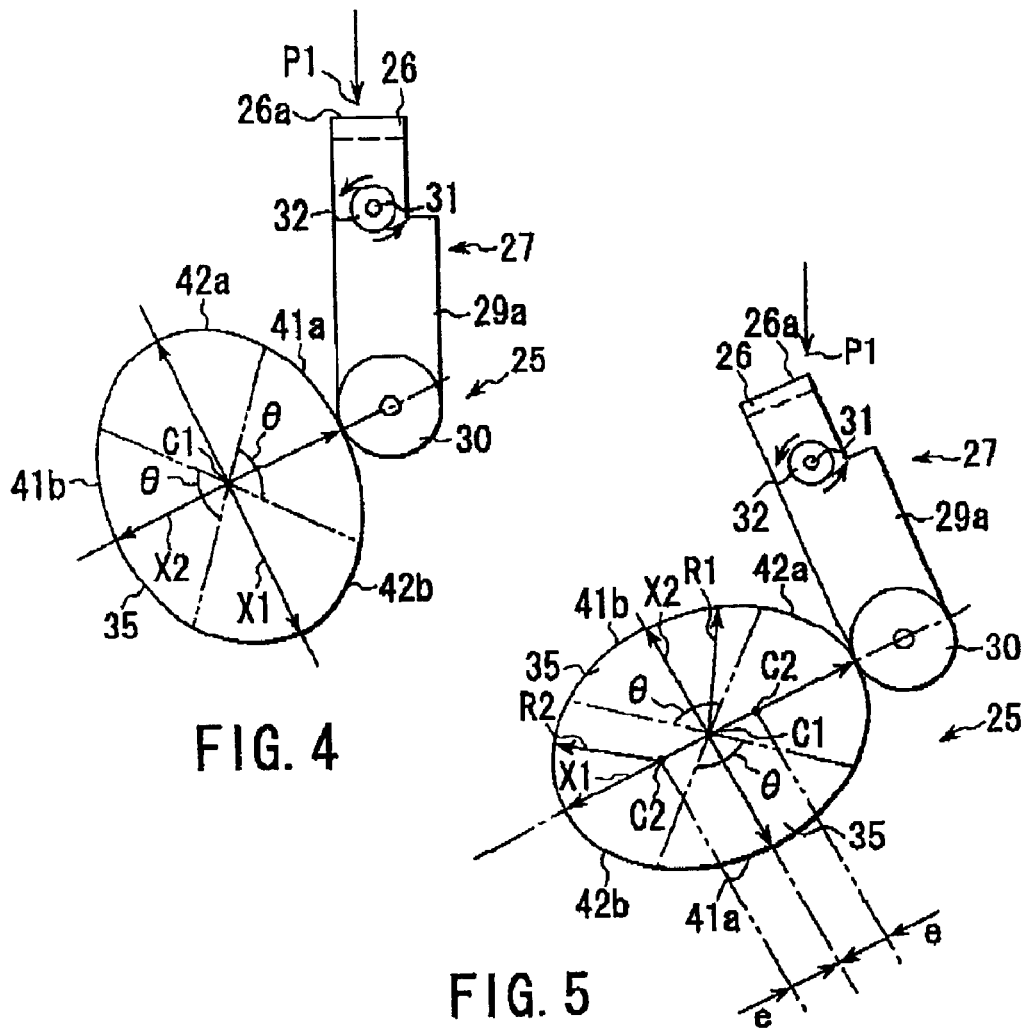
FIG. 4
FIG. 5
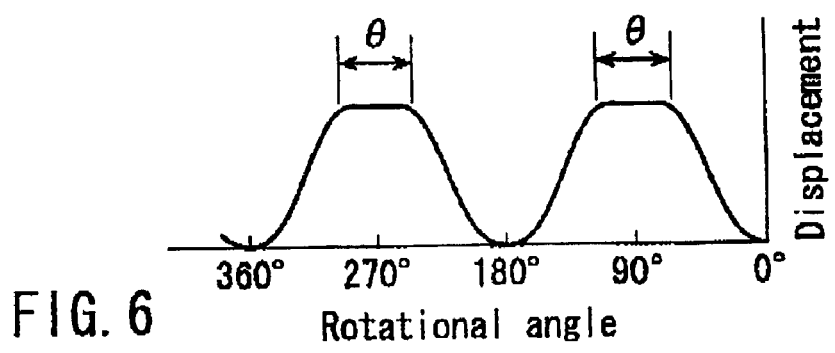
FIG. 6

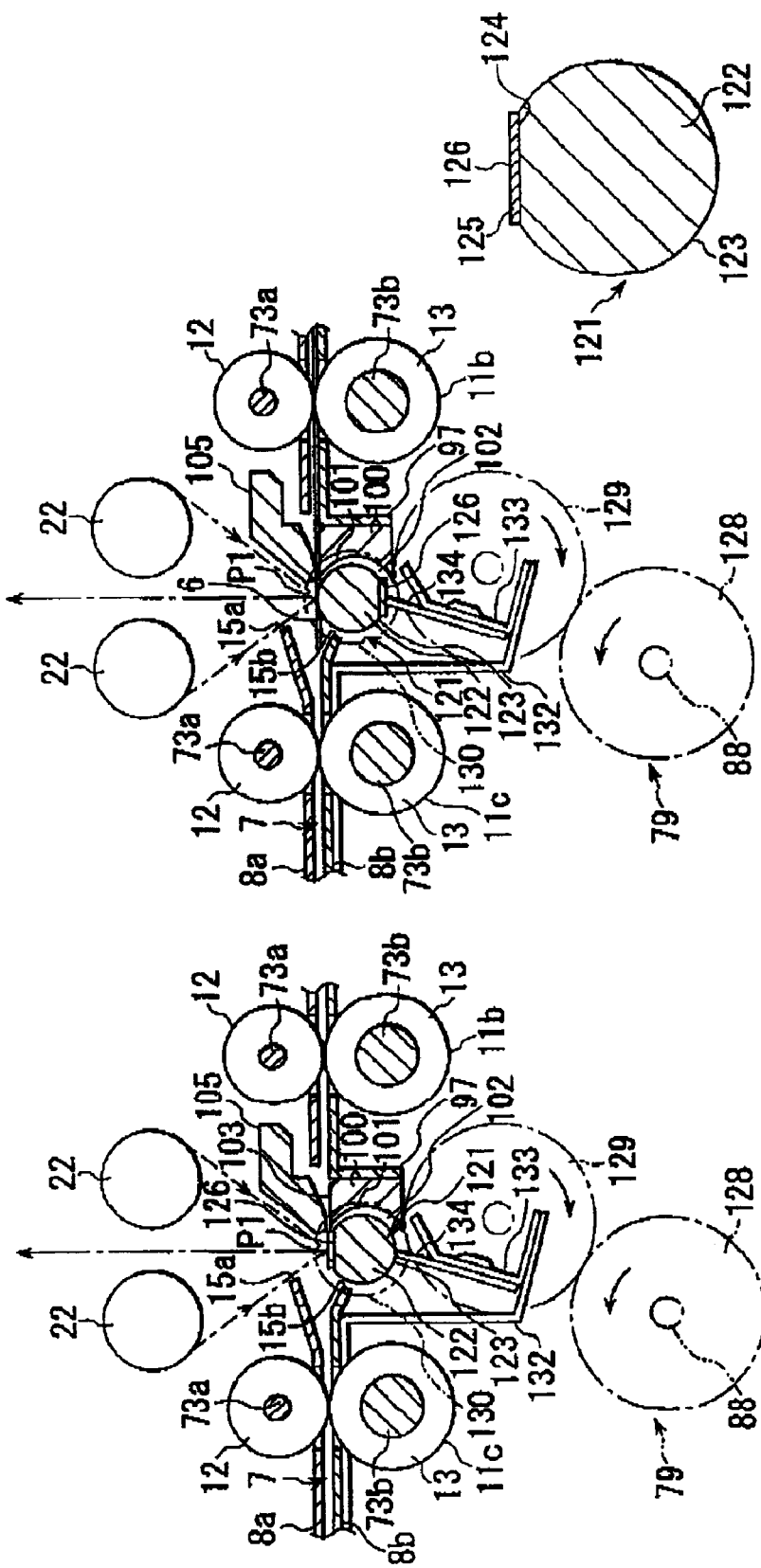

IMAGE READING APPARATUS FOR OPTICALLY READING IMAGE INFORMATION RECORDED ON SHEETLIKE RECORDING MEDIUM

CROSS-REFERENCE TO RELATED APPLICATIONS

This application is based upon and claims the benefit of priority from the prior Japanese Patent Applications No. 2000-287586, filed Sep. 21, 2000; and No. 2001-054942, filed Feb. 28, 2001, the entire contents of both of which are incorporated herein by reference.

BACKGROUND OF THE INVENTION

1. Field of the Invention

The present invention relates to an image reading apparatus such as a scanner or optical character recognition apparatus, and more particularly, to a structure for correcting an output signal from a CCD image sensor in accordance with a reference level.

2. Description of the Related Art

Conventionally, there is a character recognition apparatus (hereinafter referred to as OCR) in which a sensor unit of a reduced-imaging type is located on a transportation path along which sheets are transported. The OCR of this type recognizes image information, such as characters and figures, recorded on the sheets by optically reading the data by means of the sensor unit.

In the sensor unit of the reduced-imaging type, light from a light source is applied to each sheet when a reading position on the transportation path is reached by the sheet, and reflected light from the sheet is guided to a CCD image sensor through an optical system that includes reflection mirrors, lenses, etc. Thus, the image information is delivered as shading information to the image sensor, whereupon it is converted into an electrical output signal.

In the OCR constructed in this manner, the level of the output signal of the CCD image sensor is corrected during the reading of image data so that the image information can he read accurately. This correction includes shading correction, gain adjustment, and light modulation. The correction is carried out by means of a white reference plate for use as a reference for color balance control. In the shading correction, more specifically, the output signal of the CCD image sensor is electrically corrected so that output voltages from all photoelectric conversion elements of the image sensor are on the same level when reflected light from the white reference plate is applied to the image sensor. In the gain adjustment, the amplification degree of a signal amplifier is adjusted so that the level of the output signal of the CCD image sensor after the shading correction is fixed. According to this gain adjustment, image information on a white-ground sheet can be correctly read without regard to its reflectance. Therefore, this adjustment is essential correction for color image information to be read. The gain adjustment may be replaced with the technique of adjusting the quantity of light applied from the light source to the reading position to correct the level of the output signal of the CCD image sensor. Both the gain adjustment and the light-quantity adjustment may be performed.

In the conventional OCR, the quantity of light from the light source may change over time with use, or the level of the output signal of the CCD image sensor may change owing to deterioration of the image sensor or temperature of the work environment. Accordingly, the CCD image sensor cannot deliver a constant output signal every time the image data is read.

Conventionally, therefore, an OCR is known such that the white reference plate is located in the reading position of the transportation path. In this OCR, light from the light source is applied to a white face of the white reference plate at the start of its operation, and the quantity of light reflected by the white face and the RGB color balance are measured by means of the CCD image sensor. Correction control of read data, such as the shading correction, is executed in accordance with the output signal of the CCD image sensor.

According to an OCR described in Jpn. Pat. Appln. KOKOKU Publication No. 7-113952, the white reference plate is movable between a first position in which it is advanced to the reading position and a second position off the reading position. When the white reference plate is moved to the first position, its white face is kept at a standstill in a reading line position of the CCD image sensor, and the reference level is fetched. As the image information is read from a sheet, the white reference plate is moved from the first position to the second position and kept off the reading line position of the image sensor.

This OCR is furnished with a drive mechanism for moving the white reference plate alternatively to the first or second position. The drive mechanism includes a solenoid for use as a drive source, a plurality of links for coupling the solenoid and the white reference plate, and a return spring for urging the white reference plate toward the second position. The solenoid is turned on when the light source glows so that the correction control of read data can be executed. If the solenoid is turned on, the links convert its linear reciprocation into a rocking motion, which is transmitted to the white reference plate. Thereupon, the white reference plate moves from the second position to the first position, resisting the urging force of the return spring, and is held in the first position. When the fetch of the reference level is finished, the solenoid is turned off. Consequently, the white reference plate is forced to return to the second position by means of the return spring.

According to the conventional drive mechanism, however, the solenoid must be turned on and off every time the white reference plate is rocked from the first position to the second position or in the opposite direction. Therefore, the motion of the white reference plate is intermittent, so that rocking it from the first position to the second position takes several seconds. Since the white reference plate must be kept stationary in the first or second position, moreover, it takes time to rest the reference plate having started to rock. Thus, the white reference plate cannot be continuously rocked at high speed.

Since the linear reciprocation of the solenoid is converted into the rocking motion by means of the links in the conventional drive mechanism, moreover, the white reference plate may possibly be caused to shake by clearances that are created at the joints of the links. Accordingly, it is hard to hold the white reference plate exactly in the first position.

In transporting a plurality of sheets one after another at high speed, therefore, the conventional drive mechanism cannot rock the white reference plate corresponding to the speed of sheet transportation. Conventionally, in consequence, the correction control of the read data can be executed only at the start of operation of the OCR. If the level of the output signal of the CCD image sensor varies during the sheet reading operation, therefore, the output signal cannot be corrected. Thus, the reading accuracy may lower, or the read image information may be unstable.

On the other hand, a white reference plate that is described in Jpn. Pat. Appln. KOKAI Publication No. 4-208935 or 6-291938, for example, moves to the first position before reading the image information starts. This white reference plate moves to the second position and retreats from the transportation path before a sheet reaches the reading position on the transportation path. At the point of time when the image information starts to be read, therefore, the sheet and the white face of the white reference plate are kept out of contact with each other, so that the reference plate can be prevented from being soiled.

According to the prior art described above, the white reference plate is held in the second position off the transportation path while the image information is being read. However, the second position in which the white reference plate is held is set under the transportation path. Even when the white reference plate is moved to the second position, therefore, it is opposed to the sheet that is transported along the transportation path.

If any foreign matter, such as paper dust, scraps of paper, or dust adhering to the sheet, is separated from the sheet during transportation, therefore, it may drop onto the white reference plate, in some cases. As the number of sheets to be read increases, the foreign matter more easily adheres to and remains on the white reference plate. The white reference plate described in Jpn. Pat. Appln. KOKAI Publication No. 6-291938 maintains its substantially horizontal posture as it advances into or retreats from the sheet transportation path. In this case, in particular, the white face of the white reference plate is always opposed to a sheet. Once any foreign matter adheres to the white face of the white reference plate, therefore, it cannot be white face separated from the reference plate, so that the white face or the reference plate is inevitably soiled soon.

In consequence, accurate correction control of color balance based on white color cannot be executed with ease, so that reading errors may occur, or the read image information may be unstable.

Restraining the occurrence of reading errors requires frequent cleaning of the white reference plate. Accordingly, the maintenance of the image reading apparatus takes much time and labor, so that a user's burden increases inevitably.

BRIEF SUMMARY OF THE INVENTION

The present invention has been contrived in consideration of these circumstances, and its object is to provide an image reading apparatus in which a reference element can be operated at high speed and securely held in a first position in which it advances to a reading position, so that the image information reading accuracy of the apparatus can be improved.

In order to achieve the above object, an image reading apparatus according to a first aspect of the present invention comprises: a transportation path for transporting a sheetlike recording medium, the transportation path having a reading position through which the recording medium passes; a reading unit for optically reading image information recorded on the recording medium, the reading unit including a light source for applying light to the reading position and a light sensor for receiving reflected light from the reading position and converting the received light into an electrical output signal to be outputted; and a correcting mechanism for correcting the output signal of the light sensor in accordance with a reference level. The correcting mechanism includes a reference element and a drive mechanism. The reference element has a reference surface for setting the reference level. The reference element can rotate between a first position in which the reference element is advanced to scan the reference surface and a second position in which the reference element is retreated from the reading position. The drive mechanism comprises a rotating member interlocked with the reference element and capable of continuously rotating the rotating member in one direction, thereby rocking the reference element between the first and second positions.

According to this arrangement, the rotating member need not be stopped, so that the drive mechanism can be continuously driven without repeating on-off operation, and therefore, there is no time loss that is attributable to the on-off operation. Thus, the rocking motion of the reference element can be speeded up, and the reference level can be fetched from the reference element every time the image information is read from the recording medium. The output signal of the light sensor can be corrected in accordance with the fetched reference level.

Since the rotating member that moves the reference element rotates continuously, moreover, the rocking motion of the reference element is smooth. When the reference element is rocked to the first position, therefore, it never shakes or moves, so that it can be accurately held in the first position.

To achieve the aforesaid object, an image reading apparatus according to a second aspect of the invention comprises: a transportation path for transporting a sheetlike recording medium, the transportation path having a reading position through which the recording medium passes; a reading unit for optically reading image information recorded on the recording medium, the reading unit including a light source for applying light to the reading position and a light sensor for receiving reflected light from the reading position and converting the received light into an electrical output signal to be outputted; and a correcting mechanism for correcting the output signal of the light sensor in accordance with a reference level. The correcting mechanism includes a reference element having a reference surface for setting the reference level, the reference element being rockable between a first position in which the reference element is advanced to scan the reference surface and a second position in which the reference element is retreated from the reading position, and a drive mechanism including a cam interlocked with the reference element and a motor for continuously rotating the cam in one direction and adapted to rock the reference element between the first and second positions as the cam rotates.

According to this arrangement, the cam need not be stopped, so that the motor of the drive mechanism can be continuously driven without repeating on-off operation, and therefore, there is no time loss that is attributable to the on-off operation. Thus, the rocking motion of the reference element can be speeded up, and the reference level can be fetched from the reference element every time the image information is read from the recording medium. The output signal of the light sensor can be corrected in accordance with the fetched reference level.

Since the cam that moves the reference element rotates continuously, moreover, the rocking motion of the reference element is smooth. When the reference element is rocked to the first position, therefore, it never shakes or moves, so that it can be accurately held in the first position.

In order to achieve the aforesaid object, an image reading apparatus according to a third aspect of the invention comprises: a transportation path for transporting a sheetlike recording medium, the transportation path having a reading position through which the recording medium passes; a reading unit for optically reading image information recorded on the recording medium, the reading unit including a light source for applying light to the reading position and a light sensor for receiving reflected light from the reading position and converting the received light into an electrical output signal to be outputted; a correcting mechanism for correcting the output signal of the light sensor in accordance with a reference level, the correcting mechanism including a reference element having a reference surface for setting the reference level, the reference element being rockable between a first position in which the reference surface is advanced to scan the reference surface and a second position in which the reference surface is retreated under the reading position, and a drive mechanism including a rotating member interlocked with the reference element and capable of continuously rotating the rotating member in one direction, thereby rocking the reference element between the first and second positions; and a cover adapted to spread over the reference element when the reference element is rocked to the second position.

According to this arrangement, the rotating member need not be stopped, so that the drive mechanism can be continuously driven without repeating on-off operation, and therefore, there is no time loss that is attributable to the on-off operation. Thus, the rocking motion of the reference element can be speeded up, and the reference level can be fetched from the reference element every time the image information is read from the recording medium. The output signal of the light sensor can be corrected in accordance with the fetched reference level.

Since the rotating member that moves the reference element rotates continuously, moreover, the rocking motion of the reference element is smooth. When the reference element is rocked to the first position, therefore, it never shakes or moves, so that it can be accurately held in the first position.

When the reference element is rocked from the first position to the second position, furthermore, the reference surface of the reference element is concealed under the cover. Accordingly, the reference surface can be prevented from being exposed to the outside under the reading position. If any foreign matter such as dust adhering to the recording medium drops during transportation, therefore, it cannot easily adhere to or remain on the reference surface. Thus, the reference level can be fetched exactly, and the output signal of the light sensor can be accurately corrected in accordance with the fetched reference level.

An image reading apparatus according to a fourth aspect of the invention comprises: a transportation path for transporting a sheetlike recording medium, the transportation path having a reading position through which the recording medium passes; a reading unit for optically reading image information recorded on the recording medium, the reading unit being capable of applying light to the reading position and converting reflected light from the reading position into an electrical output signal to be outputted; a reference element having a reference surface for correcting the output signal of the reading unit for uniformity, the reference element being rockable between a first position in which the reference surface is advanced to the reading position to receive the light from the reading unit and a second position in which the reference surface is retreated under the reading position when the reading unit reads the image information on the recording medium; and a cover adapted to spread over the reference surface when the reference element is rocked to the second position.

When the reference element is rocked to the second position, according to this arrangement, the reference surface of the reference element is concealed under the cover. Accordingly, the reference surface can be prevented from being exposed to the outside under the reading position. If any foreign matter such as dust adhering to the recording medium drops during transportation, therefore, it cannot easily adhere to or remain on the reference surface. Thus, the output signal of the reading unit can be corrected accurately, and satisfactory image information can be fetched.

Since the reference surface of the reference element can be prevented from being soiled for a long period of time, moreover, it does not require frequent cleaning. Thus, time and labor required by the maintenance of the reference element can be reduced.

An image reading apparatus according to a fifth aspect of the invention comprises: a transportation path for transporting a sheetlike recording medium, the transportation path having a reading position through which the recording medium passes; a reading unit for optically reading image information recorded on the recording medium, the reading unit being capable of applying light to the reading position and converting reflected light from the reading position into an electrical output signal to be outputted; a reference element for correcting the output signal of the reading unit in accordance with a reference level, the reference element having an outer peripheral surface and a reference surface continuous to the outer peripheral surface, for setting the reference level and rockable between a first position in which the reference surface is advanced to the reading position to receive the light from the reading unit and a second position in which the reference surface is retreated under the reading position when the reading unit reads the image information on the recording medium; a drive mechanism for rotating the reference element alternatively to the first or second position; and a cleaning element located around the reference element and adapted to come slidably into contact with the outer peripheral surface and the reference surface when the reference element is rotated.

When the reference element rotates from the first position to the second position or from the second position to the first position, according to this arrangement, the cleaning element comes into sliding contact with the outer peripheral surface and the reference surface of the reference element. If any foreign matter such as dust dropped from the recording medium adheres to the outer peripheral surface or the reference surface of the reference element during the transportation of the recording medium, therefore, it can be automatically rubbed off by means of the cleaning element as the reference element rotates.

Thus, the reference level can be fetched exactly, and the output signal of the reading unit can be accurately corrected in accordance with the fetched reference level. Further, there is no possibility of the reading unit mistaking the foreign matter for the image information or the leading end of the recording medium as it reads the image information, so that errors in image information reading or recording medium transportation cannot easily occur.

Since the reference element can be prevented from being soiled for a long period of time, moreover, it does not require frequent cleaning. Thus, the maintenance of the reference element is easy, and the image information reading process can be executed with high efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a side view schematically showing the positional relationship between a roller and a plate cam with the white reference plate in its first position according to the first embodiment;

FIG. 5 is a side view schematically showing the positional relationship between the roller and the plate cam with the white reference plate in its second position according to the first embodiment;

FIG. 6 is a displacement diagram showing the relation between the rotational angle of the plate cam and the displacement of the white reference plate according to the first embodiment;

FIG. 20 is a sectional view showing the white reference element according to the fifth embodiment situated in its first position with its white face advanced to a reading position on a transportation path;

FIG. 21 is a sectional view showing the white reference element according to the fifth embodiment situated in its second position with the opening of its through hole exposed to the reading position on the transportation path;

FIG. 22 is a sectional view of the white reference element according to the fifth embodiment;

FIG. 23 is a sectional view showing a white reference element according to a sixth embodiment of the invention situated in its first position with its white face advanced to a reading position on a transportation path;

FIG. 24 is a sectional view showing the white reference element according to the sixth embodiment situated in its second position with its white face retreated from the transportation path and in contact with a brush;

FIG. 25 is a sectional view of the white reference element according to the sixth embodiment.

DETAILED DESCRIPTION OF THE INVENTION

A first embodiment of the present invention will now be described with reference to FIGS. 1 to 6.

Figure 1:
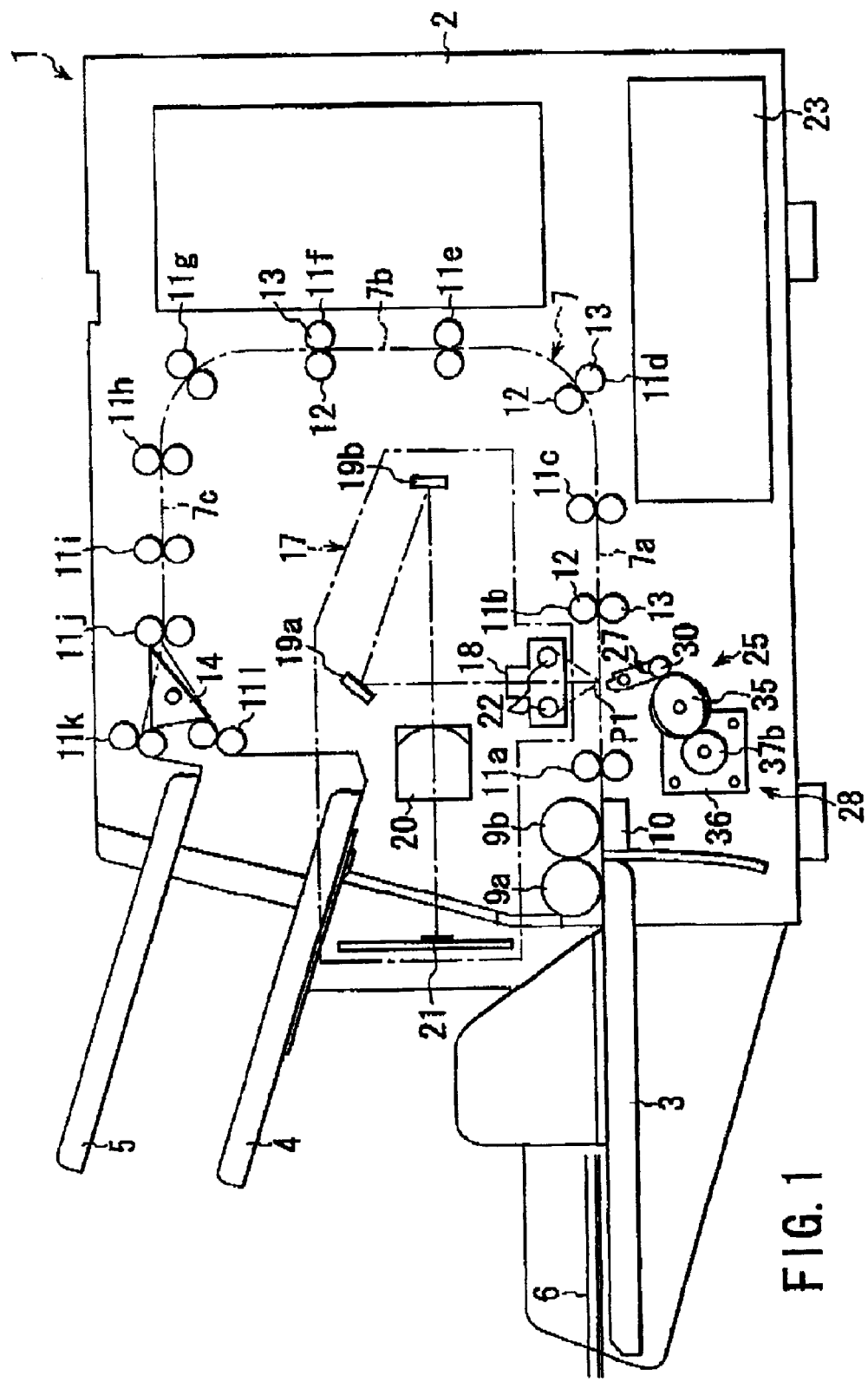
FIG. 1 is a side view showing an optical character recognition apparatus according to a first embodiment of the present invention.

FIG. 1 schematically shows a configuration of an optical character recognition apparatus (hereinafter referred to as OCR) 1. The OCR 1 comprises a box-shaped main body 2. A hopper table 3 and first and second stacker tables 4 and 5 are arranged on the front face of the main body 2. The hopper table 3 is used to carry thereon stacked sheets 6 for use as recording media. Image information to be read, including characters, figures, and/or symbols, is recorded at least in the surface of each sheet 6.

The main body 2 is provided with a transportation path 7 that connects the hopper table 3 and the first and second stacker tables 4 and 5. The transportation path 7 serves to guide the sheets 6 stacked on the hopper table 3 to the first or second stacker table 4 or 5. The path 7 includes a horizontal front portion 7a that is continuous with the hopper table 3, an intermediate portion 7b that rises from the rear end of the front portion 7a, and a horizontal rear portion 7c that extends from the upper end of an intermediate portion 7b toward the first and second stacker tables 4 and 5.

Figure 2:
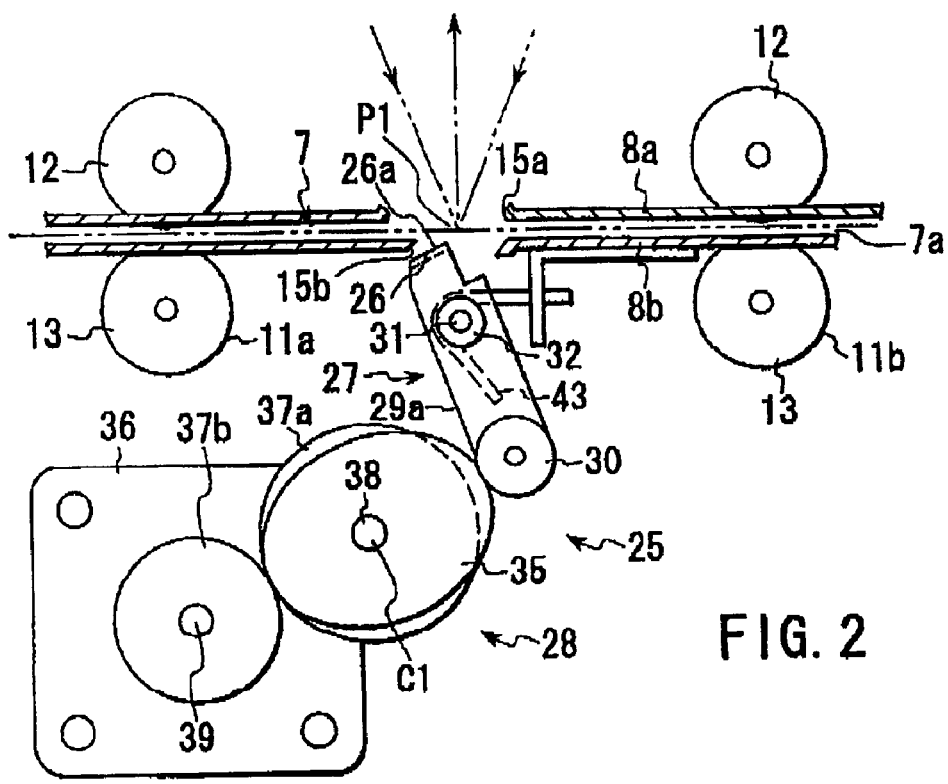
FIG. 2 is an enlarged side view showing a correcting mechanism of the optical character recognition apparatus according to the first embodiment.
Figure 3:
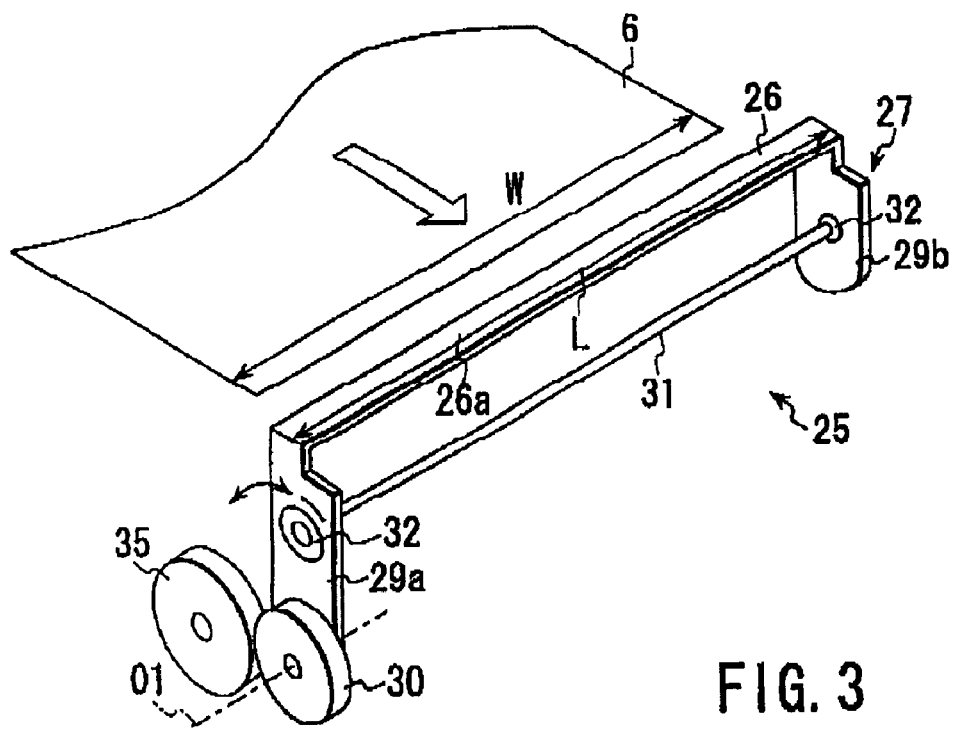
FIG. 3 is a perspective view showing a white reference plate and a plate cam of the correcting mechanism according to the first embodiment.

As shown in FIG. 2, the transportation path 7 is composed of a first guide plate 8a and a second guide plate 8b. The first and second guide plates 8a and 8b are supported facing each other on the main body 2. The sheets 6 are transported between the guide plates 8a and 8b.

A plurality of sheet-supply rollers 9a and 9b and a separator 10 are arranged on the boundary between the hopper table 3 and the transportation path 7. The rollers 9a and 9b serve to deliver the sheets 6 on the hopper table 3 to the transportation path 7 one after another. The separator 10 serves to separate a second sheet 6 and its subsequent ones from a first sheet 6 to prevent them from being delivered to the transportation path 7 if two or more of the sheets 6 are picked up at a time by means of the rollers 9a and 9b.

As shown in FIG. 1, the transportation path 7 includes a plurality of roller units 11a to 11l for transporting the sheets 6. The roller units 11a to 11l are arranged at spaces in the direction of transportation of the sheets 6. Each roller unit includes a plurality of first driving rollers 12 and a plurality of second driving rollers 13. The first and second driving rollers 12 and 13 face one another with the transportation path 7 between them, and are synchronously rotated by means of power transmitted from a motor (not shown). Thus, the sheets 6 successively pass between the adjacent roller units 11a to 11l as they are transported one after another from the starting end of the path 7 toward its termination.

As shown in FIG. 1, a gate 14 is located at the termination of the transportation path 7. The gate 14 serves to distribute each sheet 6 having reached the termination of the path 7 to the first or second stacker table 4 or 5.

As shown in FIGS. 1 and 2, the transportation path 7 has a reading position P1 in which the image information is read from each sheet 6. The reading position P1 is set in the front portion 7a of the path 7. The first and second guide plates 8a and 8b that constitute the path 7 have their respective openings 15a and 15b in positions corresponding to the reading position P1. Each of the openings 15a and 15b is in the form of a slit that extends in the width direction of each sheet 6.

The main body 2 has a reading unit 17 of a reduced-imaging type therein. The reading unit 17, which serves optically to read the image information on the surface of each sheet 6, is located over the reading position P1. The reading unit 17 is provided with a light emitting element 18, a pair of reflection mirrors 19a and 19b and a reducing lens 20 that constitute a reduction optical system, and a CCD image sensor 21 for use as a light sensor.

The light emitting element 18 includes a pair of aperture-type fluorescent lamps 22 for use as light sources. The lamps 22 are situated right over the opening 15a of the first guide plate 8a and are opposed to the reading position P1 across the opening 15a. As indicated by dashed line in FIGS. 1 and 2, light from the lamps 22 is applied to the surface of each sheet 6 transported along the transportation path 7 when the reading position P1 is reached by the sheet 6. Reflected light reflected upward by the surface of the sheet 6 is guided to the CCD image sensor 21 via the reflection mirrors 19a and 19b and the reducing lens 20. Thus, the image information on the surface of the sheet 6 is delivered as shading information to the CCD image sensor 21. After it is converted into an electrical output signal in the sensor 21, the signal is delivered to the control element 23. The output signal from the sensor 21 is subjected to image processing in the control element 23.

The fluorescent lamps 22 that apply light to the sheets 6 cannot avoid fluctuation in its luminous energy with the reduction of luminance at low temperature or with the passage of time. In the OCR 1, therefore, correction control for color balance is executed by means of the CCD image sensor 21 that receives the shading information. To attain this, the main body 2 contains therein a correcting mechanism 25 for correcting the level of the output signal from the CCD image sensor 21. The correcting mechanism 25 includes a white reference plate 26 as a reference element, a support mechanism 27 for supporting the plate 26, and a drive mechanism 28 for rocking the plate 26.

The white reference plate 26 is in the form of a belt that extends at right angles to the transportation path 7. An overall length L of the plate 26 is greater than a width W of each sheet 6. The upper surface of the plate 26 forms a white reference surface 26a.

The support mechanism 27 includes a pair of arm portions 29a and 29b and a support shaft 31. The arm portions 29a and 29b extend individually downward from the opposite end portions of the white reference plate 26 in its longitudinal direction. A roller 30 for use as a cam follower is rotatably supported on the distal end portion of the one arm portion 29a. A central axis O1 of the roller 30 extends parallel to the white reference plate 26. The support shaft 31 is supported on the frame (not shown) of the main body 2 and extends between the arm portions 29a and 29b of the plate 26. The opposite end portions of the support shaft 31 are rockably coupled to the arm portions 29a and 29b by means of bearings 32, individually.

Thus, the white reference plate 26 is supported on the frame of the main body 2 so as to be rockable between a first position shown in FIG. 4 and a second position shown in FIG. 5. When the plate 26 is rocked to the first position, its white reference surface 26a advances into the reading position P1 and faces the fluorescent lamps 22 on the same plane with the transportation path 7. When the plate 26 is rocked to the second position, the reference surface 26a leaves the reading position P1 and retreats into the space under the path 7.

The drive mechanism 28 is provided with a plate cam 35 for use as rotating members, motor 36, and first and second driving gears 37a and 37b. The plate cam 35 is coupled to the first driving gear 37a by means of a rotating shaft 38, and is rotatable integrally with the gear 37a. The motor 36 has a motor shaft 39 that can be continuously rotated in one direction. The second driving gear 37b, which is in mesh with the first driving gear 37a, can be rotated by means of the shaft 39. Thus, the rotation of the shaft 39 is transmitted to the plate cam 35 via the first and second driving gears 37a and 37b.

As shown in FIGS. 4 and 5, the plate cam 35 is substantially in the form of an ellipse that has a major axis X1 and a minor axis X2. The cam 35 has a pair of first cam surfaces 41a and 41b and a pair of second cam surfaces 42a and 42b on its outer peripheral edge portion. The first cam surfaces 41a and 41b and the second cam surfaces 42a and 42b are arranged alternately in the circumferential direction of the cam 35. They face one another across a center C1 of rotation of the cam 35 that is defined by the rotating shaft 38.

More specifically, the first cam surfaces 41a and 41b face each other on the minor axis X2 of the plate cam 35. Each first cam surface is in the shape of a circular arc concentric with the center C1 of rotation of the cam 35, and its central angle θ is about 100°. A curvature radius R1 of the first cam surfaces 41a and 41b is settled depending on the distance from the point of intersection of each first cam surface and the minor axis X2 to the center C1 of rotation of the cam 35.

The second cam surfaces 42a and 42b face each other on the major axis X1 of the plate cam 35. Each second cam surface is in the shape of a circular arc having its center in an eccentric position C2 that is deviated from the center C1 of rotation of the cam 35 by a distance e in the direction of the major axis X1. A curvature radius R2 of the second cam surfaces 42a and 42b is settled depending on the distance from the point of intersection of each second cam surface and the major axis X1 to the eccentric position C2.

Thus, the curvature radius R2 of the second cam surfaces 42a and 42b is shorter than the curvature radius R1 of the first cam surfaces 41a and 41b. The distance from each second cam surface to the center C1 of rotation of the plate cam 35 is longer than the distance from each first cam surface to the center C1 of rotation of the cam 35.

As shown in FIG. 2, the white reference plate 26 is elastically urged clockwise by means of a torsion coil spring 43. Thus, the roller 30 is pressed against one of the first and second cam surfaces 41a, 41b, 42a and 42b of the plate cam 35. If the second cam surface 42a of the cam 35 touches the roller 30 as the cam 35 rotates, as shown in FIG. 5, the plate 26 is pressed counterclockwise around the support shaft 31 and rocked to the second position, depending on the shape of the surface 42a.

If the roller 30 transfers from the second cam surface 42a to the first cam surface 41a as the plate cam 35 rotates, as shown in FIG. 4, the white reference plate 26 is pressed clockwise around the support shaft 31 and rocked to the first position by means of the torsion coil spring 43. Since the distance from the first cam surface 41a to the center C1 of rotation of the cam 35 is shorter than the distance from each second cam surface to the center C1, the force to press the roller 30 counterclockwise is canceled when the roller 30 is transferred to the first cam surface 41a. In consequence, the plate 26 is pressed clockwise and rocked from the second position to the first position by means of the urging force of the spring 43.

FIG. 6 shows the relation between the rotational angle of the plate cam 35 and the displacement of the white reference plate 26. Since each of the first cam surfaces 41a and 41b is formed in the shape of a circular arc concentric with the center C1 of rotation of the cam 35, the displacement of the roller 30 is zero as long as the roller 30 is in contact with the first cam surface 41a or 41b. Accordingly, the plate 26 is kept at a standstill in the first position while the cam 35 is rotating for an angle equal to the central angle θ of the first cam surfaces 41a and 41b. The plate 26 starts to move from the first position to the second position when the roller 30 is transferred from the first cam surface 41a or 41b to the second cam surface 42a or 42b as the plate cam 35 rotates.

The following is a description of operation for reading the image information from the sheets 6 in the OCR 1 constructed in this manner.

Before the image information is read from the sheets 6, the white reference plate 26 is held in the second position by means of the drive mechanism 28. Thus, the reference surface 26a of the plate 26 is retreated from the reading position P1 on the transportation path 7.

In reading the image information from each sheet 6, the output signal from the CCD image sensor 21 is corrected first. In doing this, the plate cam 35 is continuously rotated by means of the motor 36 so that the white reference plate 26 is rocked from the second position toward the first position. While the first cam surface 41a or 41b of the cam 35 is in contact with the roller 30, the plate 26 is kept stationary in the first position, and its reference surface 26a is exposed to the reading position P1 of the transportation path 7.

In this state, light from the fluorescent lamps 22 is applied to the reference surface 26a of the white reference plate 26. The light reflected by the reference surface 26a is guided to the CCD image sensor 21 via the reflection mirrors 19a and 19b and the reducing lens 20. The sensor 21 converts the received light into an electrical output signal and outputs it. This output signal is applied to the input of the control element 23. The control element 23 detects a reference level based on the output signal from the sensor 21, and executes correction of the output signal of the sensor 21 in accordance with this reference level.

The plate cam 35 continues to rotate while the output signal of the CCD image sensor 21 is being corrected. When the correction of the output signal is completed as the cam 35 rotates, the roller 30 transfers from the first cam surface 41a or 41b of the cam 35 to the second cam surface 42a or 42b. As shown in FIG. 5, therefore, the white reference plate 26 rocks from the first position toward the second position, whereupon the reference surface 26a is retreated from the reading position P1.

The white reference plate 26 is held in the second position while the second cam surface 42a or 42b is in contact with the roller 30. If the plate 26 is held in the second position, the sheets 6 on the hopper table 3 are delivered one after another into the transportation path 7 via the sheet-supply rollers 9a and 9b. When one of the sheets 6 reaches the reading position P1, light from the fluorescent lamps 22 is applied to its surface. The light reflected by the surface of the sheet 6 is guided to the CCD image sensor 21 via the reflection mirrors 19a and 19b and the reducing lens 20. The sensor 21 converts the received light into an electrical output signal and outputs it. This output signal is subjected to image processing in the control element 23, and the image information recorded on the sheet 6 is read.

After the reading process for the one sheet 6 is finished, the roller 30 transfers from the second cam surface 42a or 42b of the plate cam 35 to the first cam surface 41a or 41b. Accordingly, the plate 26 is rocked again to the first position before another sheet 6 reaches the reading position P1 after the termination of the reading process for the first sheet 6, and the correction of the output signal of the CCD image sensor 21 is executed. On and after this, the OCR 1 alternately repeats the correction of the output signal and the image information reading until the sheets 6 on the hopper table 3 disappear. After the reading process is finished, the sheets 6 are successively transported to the termination of the transportation path 7, whereupon they are distributed to the first or second stacker table 4 or 5 by means of the gate 14.

According to this arrangement, the white reference plate 26 is moved alternately to the first and second positions by means of the plate cam 35 that continuously rotates in one direction. Accordingly, the drive mechanism 28 is continuously driven without repeating on-off operation, so that there is no time loss that is attributable to the on-off operation. Thus, the rocking motion of the plate 26 can be speeded up, and the reference level can be fetched from the reference surface 26a of the plate 26 every time the image information is optically read from each sheet 6. The level of the output signal of the CCD image sensor 21 can be corrected in accordance with the fetched reference level. Thus, satisfactory image information can be fetched steadily for a long period of time.

Further, the plate cam 35 that rocks the white reference plate 26 continuously rotates without interruption during the reading operation, so that the motion of the plate 26 is smooth. When the plate 26 is rocked to the first position, therefore, its reference surface 26a never shakes or moves, so that the plate 26 can be accurately held in the first position.

Besides, each of the first cam surfaces 41a and 41b that hold the white reference plate 26 in the first position is formed in the shape of a circular arc concentric with the center C1 of rotation of the plate cam 35. Despite the rotation of the cam 35, therefore, the plate 26 can be kept at a standstill in the first position for a predetermined time. In consequence, the reference level that is needed in correcting the output signal of the CCD image sensor 21 can be fetched with the reference surface 26a fixed in position, so that the detection of the reference level and the correction of the output signal can be carried out with reliability.

According to the arrangement described above, moreover, the first cam surfaces 41a and 41b for holding the white reference plate 26 in the first position and the second cam surfaces 42a and 42b for holding the plate 26 in the second position are arranged alternately in the circumferential direction of the plate cam 35. Accordingly, the white reference plate 26 can be reciprocated twice between the first and second positions every time the cam 35 makes one revolution, so that the rocking motion of the plate 26 can be speeded up with ease.

Figure 7:
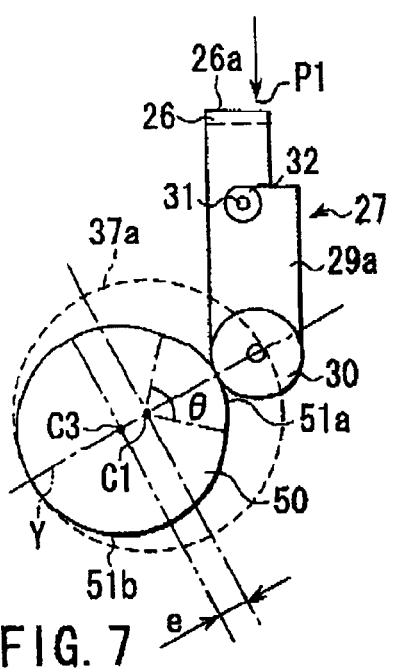
FIG. 7 is a side view schematically showing the positional relationship between a roller and a plate cam with a white reference plate in its first position, in a correcting mechanism of an optical character recognition apparatus according to a second embodiment of the invention.
Figure 8:
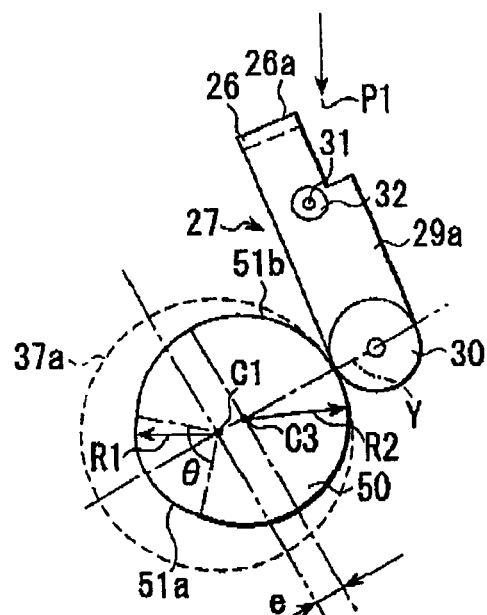
FIG. 8 is a side view schematically showing the positional relationship between the roller and the plate cam with the white reference plate in its second position according to the second embodiment.
Figure 9:
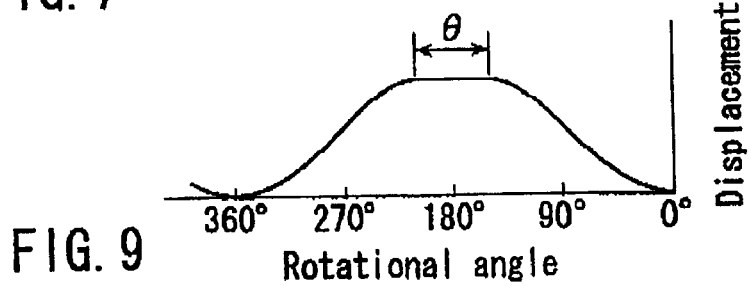
FIG. 9 is a displacement diagram showing the relation between the rotational angle of the plate cam and the displacement of the white reference plate according to the second embodiment.

FIGS. 7 to 9 show a second embodiment of the invention.

The second embodiment differs from the first embodiment in the configuration of a plate cam 50 of a correcting mechanism 25. The first and second embodiments share other configurations of the correcting mechanism 25.

As shown in FIGS. 7 and 8, the plate cam 50 is in the shape of a disk that has a diameter smaller than that of a first driving gear 37a. The cam 50 has a single first cam surface 51a and a single second cam surface 51b on its outer peripheral edge portion. The first cam surface 51a is in the shape of a circular arc concentric with a center C1 of rotation of the cam 50, and its central angle θ is about 90°. The second cam surface 51b is in the shape of a circular arc having its center in an eccentric position C3 that is deviated from the center C1 toward a roller 30 by a distance e, and is continuous with the first cam surface 51a. The eccentric position C3 is situated on a reference line Y that connects the center C1 and the center of rotation of the roller 30.

A curvature radius R2 of the second cam surface 51b is longer than a curvature radius R1 of the first cam surface 51a. Accordingly, the distance from the second cam surface 51b to the center C1 of rotation of the plate cam 50 is longer than the distance from the first cam surface 51a to the center C1. If the first cam surface 51a is situated on the opposite side of the center C1 of rotation of the cam 50 to the roller 30 as the cam 50 rotates, as shown in FIG. 8, the second cam surface 51b projects longest toward the roller 30.

If the second cam surface 51b of the plate cam 50 touches the roller 30, a white reference plate 26 is pressed counterclockwise around a support shaft 31 and rocked to the second position, depending on the shape of the surface 51b.

If the roller 30 transfers from the second cam surface 51b to the first cam surface 51a as the plate cam 50 rotates, as shown in FIG. 7, the white reference plate 26 is pressed clockwise around the support shaft 31 and rocked to a first position by means of a torsion coil spring 43. Since the distance from the first cam surface 51a to the center C1 of rotation of the cam 50 is shorter than the distance from the second cam surface 51b to the center C1. The plate 26 is pressed clockwise and rocked from a second position to the first position by means of the urging force of the spring 43 when the roller 30 is transferred to the first cam surface 51a.

FIG. 9 shows the relation between the rotational angle of the plate cam 50 and the displacement of the white reference plate 26. Since the first cam surface 51a is formed in the shape of a circular arc concentric with the center C1 of rotation of the cam 50, the displacement of the roller 30 is zero as long as the roller 30 is in contact with the first cam surface 51a. Accordingly, the plate 26 is kept at a standstill in the first position while the cam 50 is rotating for an angle equal to the central angle θ of the first cam surface 51a. The plate 26 starts to move from the first position to the second position when the roller 30 is transferred from the first cam surface 51a to the second cam surface 51b as the plate cam 50 rotates.

Figure 10:
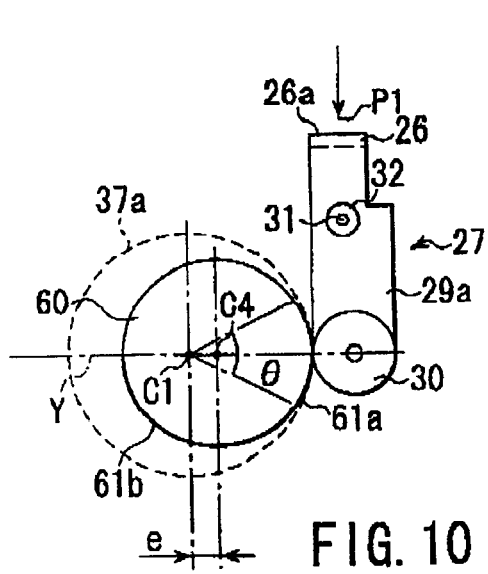
FIG. 10 is a side view schematically showing the positional relationship between a roller and a plate cam with a white reference plate in its first position, in a correcting mechanism of an optical character recognition apparatus according to a third embodiment of the invention.
Figure 11:
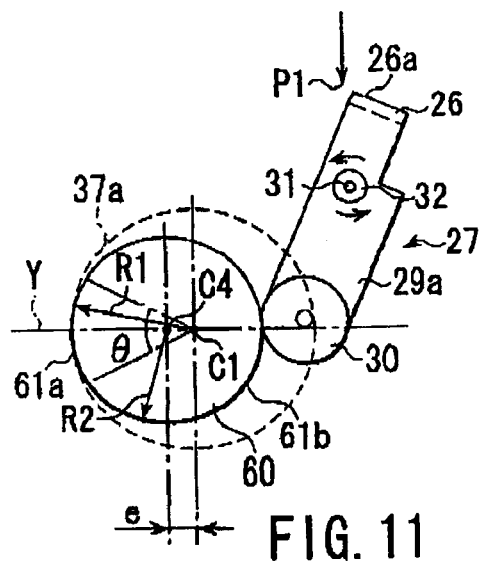
FIG. 11 is a side view schematically showing the positional relationship between the roller and the plate cam with the white reference plate in its second position according to the third embodiment.

FIGS. 10 and 11 show a third embodiment of the invention.

The third embodiment differs from the first embodiment in the configuration of a plate cam 60 of a correcting mechanism 25. In this third embodiment, the direction of rocking motion of a white reference plate 26 with respect to a reading position P1 is reverse to the direction according to the first embodiment.

As shown in FIGS. 10 and 11, the plate cam 60 is in the shape of a disk that has a diameter smaller than that of a first driving gear 37a. The cam 60 has a single first cam surface 61a and a single second cam surface 61b on its outer peripheral edge portion. The first cam surface 61a is in the shape of a circular arc concentric with a center C1 of rotation of the cam 60, and its central angle θ is about 50°. The second cam surface 61b is in the shape of a circular arc having its center in an eccentric position C4 that is deviated from the center C1 by a distance e on the side farther from the roller 30, and is continuous with the first cam surface 61a. The eccentric position C4 is situated on a reference line Y that connects the center C1 and the center of rotation of the roller 30.

A curvature radius R1 of the first cam surface 61a is longer than a curvature radius R2 of the second cam surface 61b. Accordingly, the distance from the first cam surface 61a to the center C1 of rotation of the plate cam 60 is longer than the distance from the second cam surface 61b to the center C1. If the second cam surface 61b is situated on the opposite side of the center C1 of rotation of the cam 60 to the roller 30 as the cam 60 rotates, as shown in FIG. 10, the first cam surface 61a projects longest toward the roller 30.

As shown in FIG. 11, the white reference plate 26 is rocked to a second position when the second cam surface 61b touches the roller 30. Since the distance from the second cam surface 61b to the center C1 of rotation of the cam 60 is shorter than the distance from the first cam surface 61a to the center C1, the second cam surface 61b moves away from the roller 30. Accordingly, the white reference plate 26 is pressed clockwise and rocked to the second position by means of the urging force of the torsion coil spring 43.

If the roller 30 transfers from the second cam surface 61b to the first cam surface 61a as the plate cam 60 rotates, as shown in FIG. 10, the surface 61a projects toward the roller 30. Accordingly, the plate 26 is pressed counterclockwise around a support shaft 31 and rocked from the second position to the first position, depending on the shape of the first cam surface 61a. While the cam 60 is rotating for an angle equal to the central angle θ of the first cam surface 61a, the surface 61a continues to be in contact with the roller 30, and the plate 26 is kept at a standstill in the first position.

According to the second and third embodiments arranged in this manner, the white reference plate 26 is moved alternately between the first and second positions by means of the plate cam 50 or 60 that rotates continuously in one direction. As in the case of the first embodiment, therefore, the rocking motion of the plate 26 can be speeded up.

In the first to third embodiments described above, moreover, the output signal of the CCD image sensor 21 is corrected every time the image information is read from each sheet. However, the present invention is not limited to these embodiments. For example, the output signal of the CCD image sensor may be corrected with predetermined timing or every time the image information is read from an arbitrary number of sheets.

FIGS. 12 to 18 show an OCR 1 according to a fourth embodiment of the invention.

The fourth embodiment differs from the first embodiment mainly in the configuration of a correcting mechanism 70 for correcting the output signal of the CCD image sensor 21. The first and third embodiments share other basic configurations of the OCR 1. In the description of the fourth embodiment to follow, therefore, like reference numerals refer to like components used in the first embodiment, and a description of those components is omitted.

Figure 13:
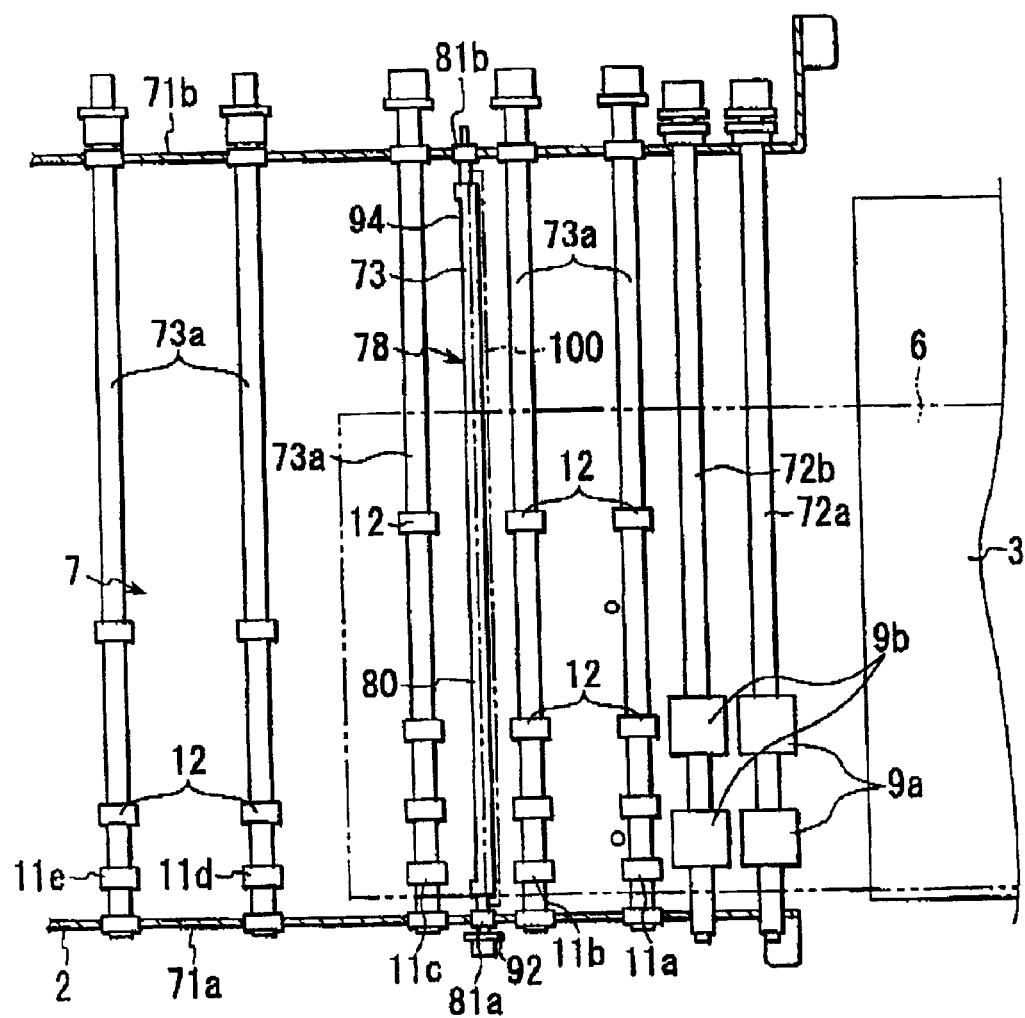
FIG. 13 is a plan view showing the positional relationship a plurality of roller units on a transportation path and a white reference element according to the fourth embodiment.

As shown in FIG. 13, a main body 2 includes a pair of side plates 71a and 71b. A transportation path 7 is located between the side plates 71a and 71b. Sheet-supply rollers 9a and 9b that are located at the starting end of the path 7 are supported by means of roller shafts 72a and 72b, respectively. First and second driving rollers 12 and 13 of roller units 11a to 11l are supported on roller shafts 73a and 73b, individually. The roller shafts 72a, 72b and 73a, 73b extend between the side plates 71a and 71b.

Figure 12:
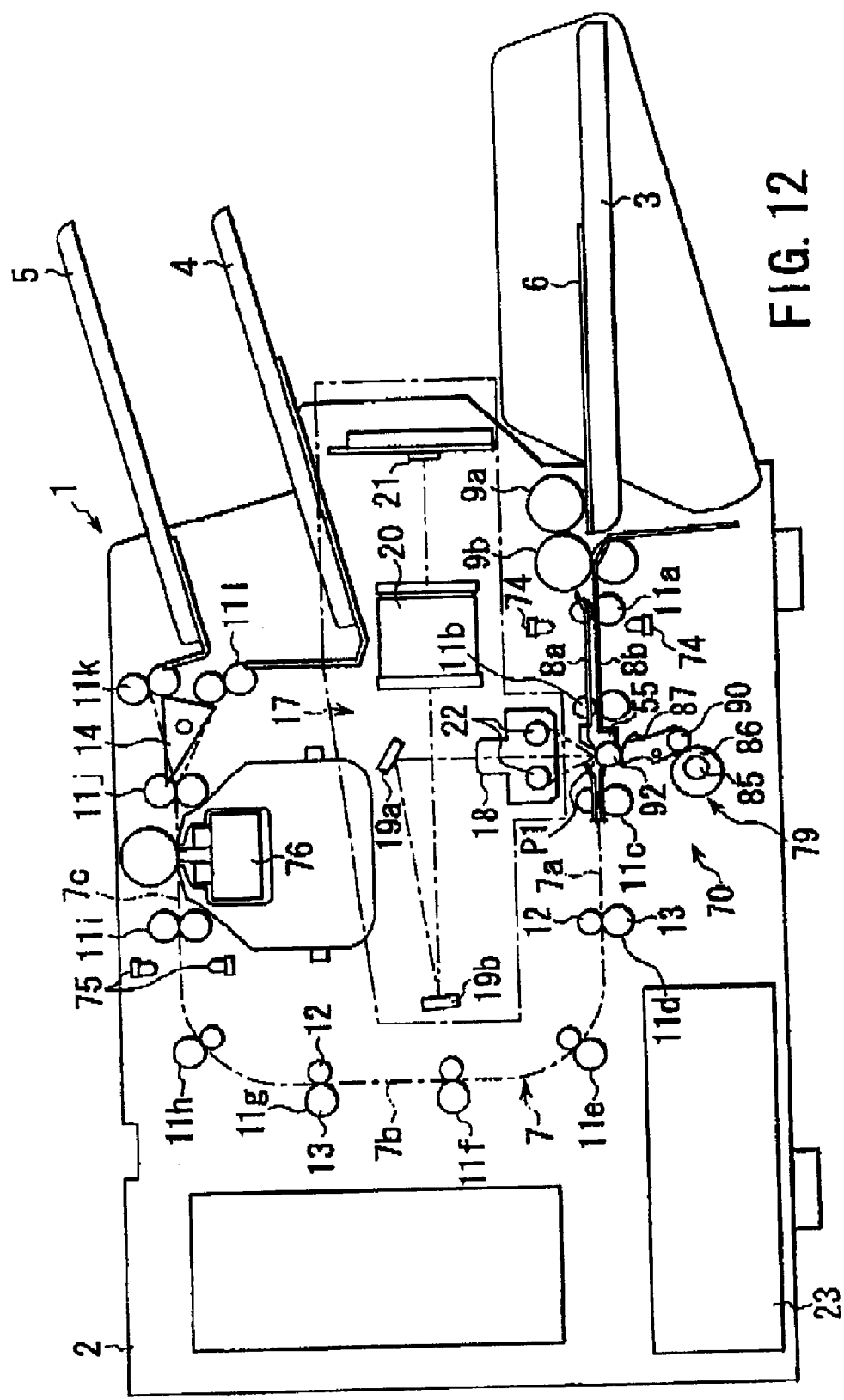
FIG. 12 is a side view showing an optical character recognition apparatus according to a fourth embodiment of the invention.

As shown in FIG. 12, a first sensor 74 is located at the starting end of the transportation path 7. The first sensor 74 serves optically to detect whether or not a sheet 6 is delivered into the path 7 and to settle the timing for feeding the next sheet 6 into the path 7. A second sensor 75 and a printer 76 are located at the termination of the path 7. The second sensor 75 serves to settle the timing for the operation of a gate 14 when the termination of the path 7 is reached by the sheet 6. The printer 76 is used to print the sheet 6 with a sign to the effect that the reading process is executed. Thus, after the sheet 6, transported to the termination of the transportation path 7, is printed by means of the printer 76, it is distributed to a first or second stacker table 4 or 5 by means of the gate 14.

Figure 17:
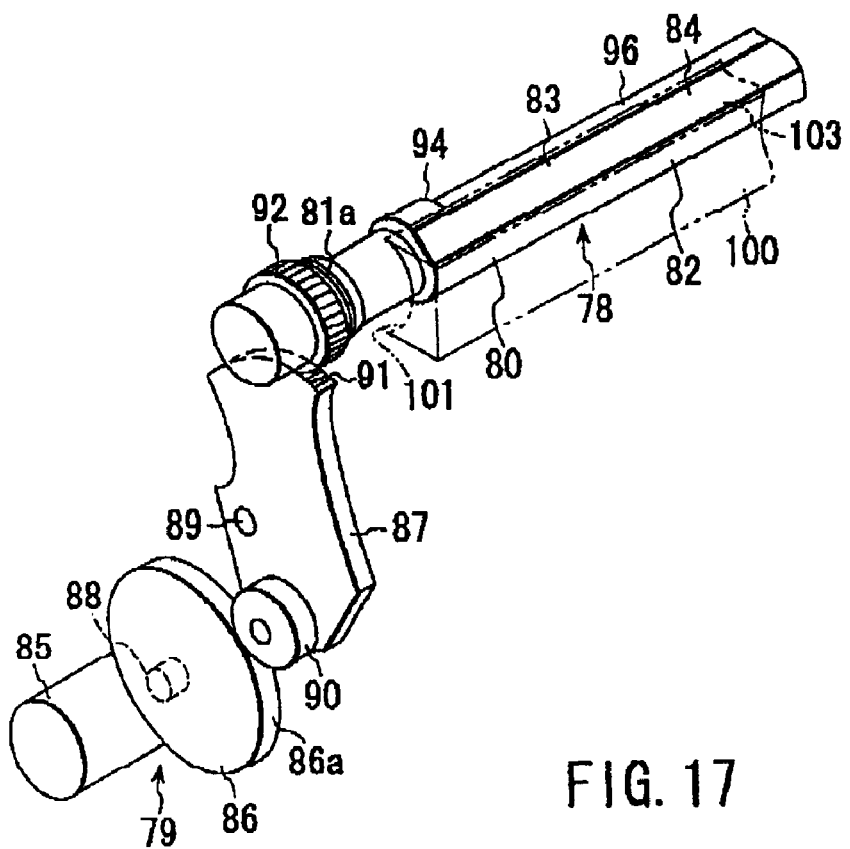
FIG. 17 is a perspective view showing the positional relationship between the white reference element and its drive mechanism according to the fourth embodiment.

The correcting mechanism 70 is located under a reading position P1. The correcting mechanism 70 includes a white reference element 78 and a drive mechanism 79 for rocking the element 78. As shown in FIGS. 13 and 17, the element 78 is composed of a straight round rod 80 that extends across each sheet 6. The opposite end portions of the rod 80 are supported individually on the side plates 71a and 71b of the main body 2 by means of bearings 81a and 81b for rocking motion. The rod 80 faces the transportation path 7 across the opening 15b of the second guide plate 8b.

As seen from FIGS. 14 to 17, the round rod 80 has a circular outer peripheral surface 82. A part of the surface 82 forms a flat surface 82a. The flat surface 82a extends in a straight line in the axial direction of the rod 80. A white tape 83 is stuck on the flat surface 82a. The tape 83 forms a white face 84 as a reference surface on the outer peripheral surface 82 of the rod 80. The white face 84 extends in a straight line in the axial direction of the rod 80, and its overall length L is greater than a reading width W of each sheet 6.

Figure 15:
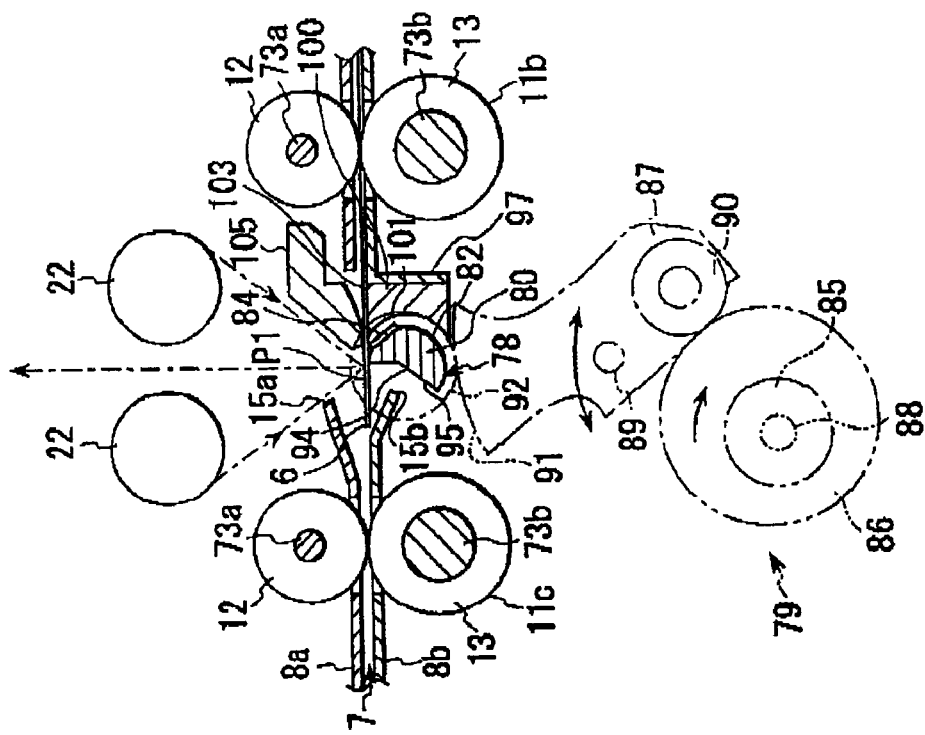
FIG. 15 is a sectional view showing the white reference element according to the fourth embodiment situated in its second position with its white face concealed under a cover.
Figure 14:
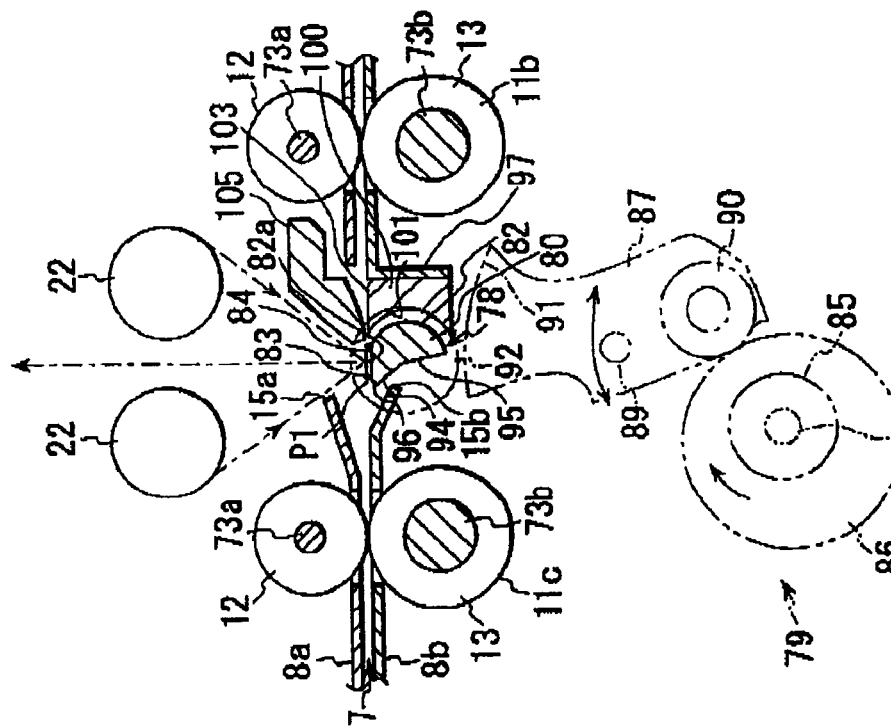
FIG. 14 is a sectional view showing the white reference element according to the fourth embodiment situated in its first position with its white face advanced to a reading position on the transportation path.

The white reference element 78 is rockable between a first position in which the white face 84 is exposed to the reading position P1 and a second position at an angular distance of about 60° in the clockwise direction from the first position. When the element 78 is in the first position as shown in FIG. 14, its white face 84 is situated flush with the transportation path 7, and light from fluorescent lamps 22 is applied to the surface 84. When the white reference element 78 is rocked to the second position as shown in FIG. 15, the white face 84 retreats into the space under the path 7, and the sheet 6 passes over the surface 84.

The drive mechanism 79 serves to rock the white reference element 78 alternatively to the first or second position. The mechanism 79 is provided with a motor 85 and rotating members including a plate cam 86 and an idle gear 87. The motor 85 has a motor shaft 88, which can be continuously rotated in the clockwise direction indicated by the arrow in FIGS. 14 and 15. The plate cam 86 is in the shape of a disk that has a cam surface 86a on its outer peripheral edge portion, and the motor shaft 88 is coupled to the cam 86. The cam 86 is eccentric to the shaft 88.

The idle gear 87 is rockably supported on the one side plate 71a of the main body 2 by means of a pivot 89. The gear 87 includes a roller 90 and a fanwise toothed portion 91. The roller 90 and the toothed portion 91 are located on the opposite sides of the pivot 89. The roller 90 is rotatably in contact with the cam surface 86a of the plate cam 86. The toothed portion 91 is in mesh with a driving gear 92 that is fixed to one end of the round rod 80.

Thus, when the plate cam 86 rotates, the idle gear 87 rocks alternatively in the clockwise and counterclockwise directions around the pivot 89 for an angle equivalent to the eccentricity of the cam 86 to the motor shaft 88. This rocking motion of the gear 87 is transmitted to the white reference element 78 by means of the driving gear 92 that is in mesh with the toothed portion 91, whereupon the element 78 is rocked alternatively to the first or second position.

Figure 16:
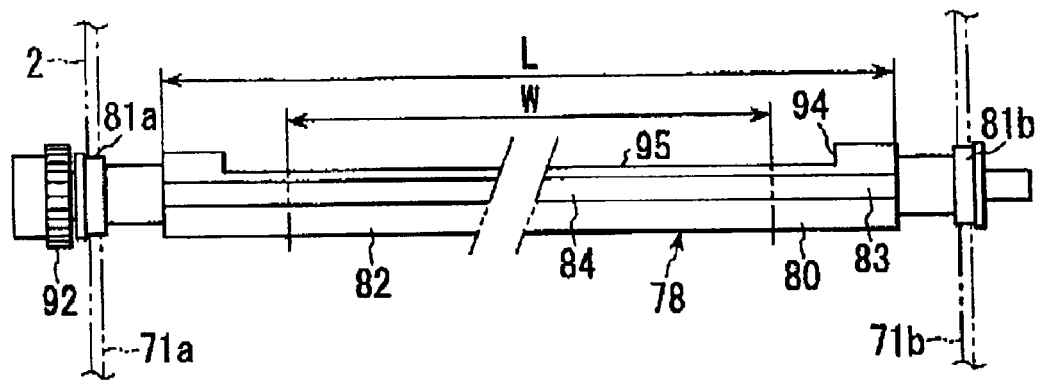
FIG. 16 is a plan view of the white reference element according to the fourth embodiment.
Figure 18:
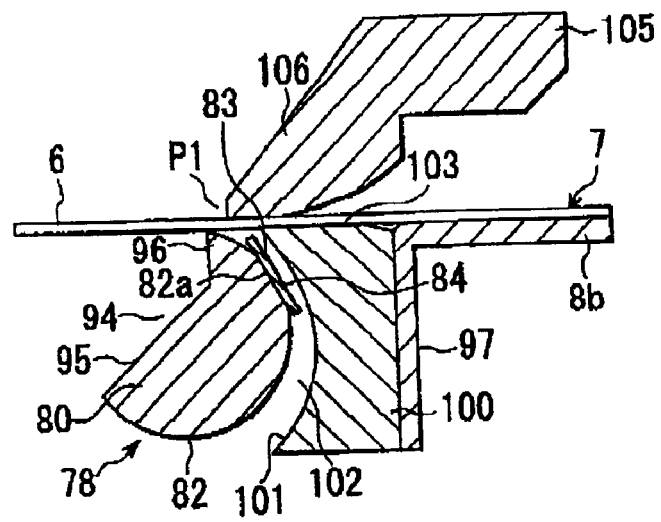
FIG. 18 is an enlarged sectional view showing the white face of the white reference element according to the fourth embodiment located in a recess of the cover.
Figure 19:
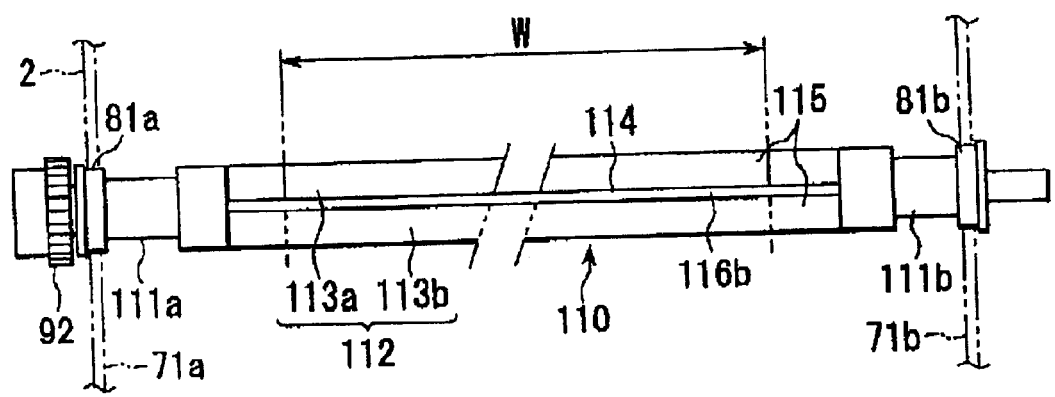
FIG. 19 is a plan view of a white reference element according to a fifth embodiment of the invention.

As shown in FIGS. 16 to 18, the round rod 80 of the white reference element 78 has a notch 94. The notch 94 extends in the axial direction of the rod 80 and opens in the outer peripheral surface 82 of the rod 80 in a position off the white face 84. The overall length of the notch 94 is greater than the reading width W of each sheet 6.

The notch 94 faces upward to be exposed to the transportation path 7 when the white reference element 78 is rocked to the second position. The base of the notch 94 forms a flat guide surface 95 that passes near the center of the round rod 80 and extends in the diametrical direction of the rod 80. The guide surface 95 is inclined at a downward angle to the path 7 when the element 78 is rocked to the second position. Thus, in the present embodiment, the guide surface 95 of the rod 80 serves as a slope.

As shown in FIG. 18, one edge portion of the guide surface 95 is continuous with the outer peripheral surface 82 of the round rod 80 in a position adjacent to the white face 84. The one edge portion of the guide surface 95, in conjunction with the outer peripheral surface 82 of the rod 80, constitutes a sharply edged angle portion 96. The angle portion 96 extends in the axial direction of the white reference element 78 and is situated flush with the transportation path 7 when the element 78 is rocked to the second position. Thus, the angle portion 96 of the element 78 slidably touches the under surface of each sheet 6 that is transported along the path 7 and supports the sheet 6 from below, thereby guiding the sheet 6 in transportation.

All the area of the white reference element 78 except the white face 84, that is, the outer peripheral surface 82 and the guide surface 95 of the plate cam 86, are blackened in order to lower the reflectance of the element 78.

As shown in FIGS. 14 and 18, the second guide plate 8b has a downwardly bent flange portion 97 in its edge portion that is continuous with the opening 15b. The flange portion 97 is situated on the front side of the white reference element 78 with respect to the direction of transportation of the sheets 6. A cover 100 is fixed to the flange portion 97. The cover 100 is in the form of a prism that extends along the element 78 and is situated just in front of the element 78.

The cover 100 has a recess 101 in its surface that faces the white reference element 78. The recess 101 is curved in a circular arc that extends along the outer peripheral surface 82 of the element 78. A narrow gap 102 is defined between the recess 101 and the outer peripheral surface 82 of the element 78. If the element 78 is rocked to the second position, therefore, the white face 84 gets into the gap 102 and is concealed from the outside by means of the recess 101.

The top surface of the cover 100 forms a flat guide surface 103, The guide surface 103 is situated flush with the second guide plate 8b, Thus, the guide surface 103 can guide each sheet 6 in transportation in cooperation with the second guide plate 8b.

A guide block 105 is located over the cover 100. The guide block 105 is in the form of a rod that extends in the axial direction of the white reference element 78, and is supported on the first guide plate 8a and the main body 2 by means of brackets (not shown). The guide block 105 includes an extending portion 106, which projects diagonally downward in the direction of transportation of the sheets 6. As seen from FIG. 18, the distal end of the extending portion 106 faces the boundary between the guide surface 103 and the white reference element 78. As each sheet 6 passes through the reading position P1, therefore, the extending portion 106 presses the sheet 6 against the guide surface 103 and the angle portion 96 of the element 78 lest the sheet 6 lift above the transportation path 7.

The following is a description of operation for reading the image information from the sheets 6 in the OCR 1 constructed in this manner.

Before the image information is read from the sheets 6, the white reference element 78 is held in the second position by means of the drive mechanism 79. Thus, the white face 84 of the element 78 is retreated from the reading position P1 on the transportation path 7.

In reading the image information from each sheet 6, the output signal of the CCD image sensor 21 is corrected first. In doing this, the white reference element 78 is rocked from the second position to the first position by means of the drive mechanism 79. As this is done, the white face 84 of the element 78 is exposed to the reading position P1.

In this state, light from the fluorescent lamps 22 is applied to the white face 84 of the white reference element 78. The light reflected by the white face 84 is guided to the CCD image sensor 21 via reflection mirrors 19a and 19b and a reducing lens 20. The sensor 21 converts the received light into an electrical output signal and outputs it. This output signal is input to a control element 23. As in the case of the first embodiment, therefore, a reference level based on the output signal of the sensor 21 is detected in the control element 23, and the output signal of the sensor 21 is corrected in accordance with this reference level.

The plate cam 86 continues to rotate while the output signal of the CCD image sensor 21 is being corrected. When the correction of the output signal is completed, the white reference element 78 rocks for about 60° in the clockwise direction of FIGS. 14 and 15, following rotation of the cam 86, whereupon it transfers from the first position to the second position. In consequence, the white face 84 retreats into the space under the transportation path 7 and gets into the arcuately curved recess 101 of the cover 100. Thus, the white face 84 is concealed under the cover 100.

When the white reference element 78 is in the second position, its angle portion 96 is situated flush with the transportation path 7. At the same time, the notch 94 of the element 78 is exposed to the path 7, and the guide surface 95 of the notch 94 is kept inclined at the downward angle to the path 7.

When the white reference element 78 is held in the second position, the sheets 6 on the hopper table 3 are delivered to the transportation path 7. When one of the sheets 6 reaches the reading position P1, light from the fluorescent lamps 22 is applied to the surface of the sheet 6. Thereupon, the image information on the surface of the sheet 6 is read in the same manner as in the case of the first embodiment.

As this is done, the sheet 6 is pressed against the guide surface 103 of the cover 100 and the angle portion 96 of the white reference element 78 by means of the extending portion 106 of the guide block 105, and is guided by the guide surface 103 and the angle portion 96 as it passes through the reading position P1. After the image information reading process is finished, the sheet 6 is transported to the termination of the transportation path 7 and is printed by means of the printer 76. Thereafter, it is delivered to the first or second stacker table 4 or 5.

According to this arrangement, the white reference element 78 is held in the second position while the image information is being read from the sheet 6 in the reading position P1 on the transportation path 7. Thus, the white face 84 of the element 78 is retreated under the path 7 and located in the gap 102 between the element 78 and the cover 100.

In consequence, the white face 84 of the white reference element 78 is kept concealed from the outside by means of the cover 100. If any foreign matter, such as paper dust, scraps of paper, or dust adhering to the sheet 6, drops from it during the reading process, therefore, it cannot be easily guided to or caused to adhere to the white face 84. Thus, even if the information content of the sheet 6 to be read is increased, the white face 84 can be prevented from being soiled, so that the necessary reference level for the correction of the output signal of the CCD image sensor 21 can be fetched steadily.

According to this arrangement, moreover, the sheet 6 passes over the white reference element 78 during the image information reading process, as shown in FIG. 18. As this is done, the guide surface 95 of the notch 94 of the element 78 is exposed to the transportation path 7 and faces the under surface of the sheet 6 that passes through the reading position P1. The guide surface 95 is kept inclined at the downward angle to the path 7.

If any foreign matter drops from the sheet 6 that passes through the reading position P1, therefore, it can slide down along the guide surface 95 as it is. Accordingly, foreign matter cannot remain on the black guide surface 95 or the outer peripheral surface 82 of the round rod 80, so that there is no possibility of the CCD image sensor 21 mistaking it for the leading end of or image information on another sheet 6 when it reads the information on the next sheet 6. Thus, errors in image information reading or sheet transportation cannot easily occur, so that satisfactory image information can be fetched steadily for a long period of time.

Since the white face 84 of the white reference element 78 cannot be easily soiled, moreover, it does not require frequent cleaning. Consequently, time and labor required by the maintenance of the white reference element 78 can be reduced, and therefore, a user's burden can be eased.

FIGS. 19 to 22 show a fifth embodiment of the invention.

The fifth embodiment differs from the fourth embodiment in the configuration of a white reference element 110. The fourth and fifth embodiments share other basic configurations of the OCR 1.

The white reference element 110 is composed of a pair of columnar journal portions 111a and 111b and a shaft portion 112 interposed between them. The journal portions 111a and 111b are coaxially arranged with the shaft portion 112 between them, and are rotatably supported on the side plates 71a and 71b of the main body 2 by means of the bearings 81a and 81b, respectively. The driving gear 92 that is in mesh with the idle gear 87 is fixed to the one journal portion 111a.

The shaft portion 112 has an overall length that is greater than the reading width W of each sheet 6. As seen from FIGS. 19 and 22, the shaft portion 112 is provided with a first shaft body 113a and a second shaft body 113b. Each of the shaft bodies 113a and 113b has one and the other ends that are spaced in its axial direction and coupled to the journal portions 111a and 111b, respectively.

The first and second shaft bodies 113a and 113b are opposed to each other in the diametrical direction of the shaft portion 112. A through hole 114 is formed between the shaft bodies 113a and 113b. The through hole 114 extends in the diametrical direction of the shaft portion 112 and includes two openings 116a and 116b in an outer peripheral surface 115 of the shaft portion 112. Each of the openings 116a and 116b is in the form of a slit that extends in the axial direction of the shaft portion 112.

Figures 20, 21, 22:
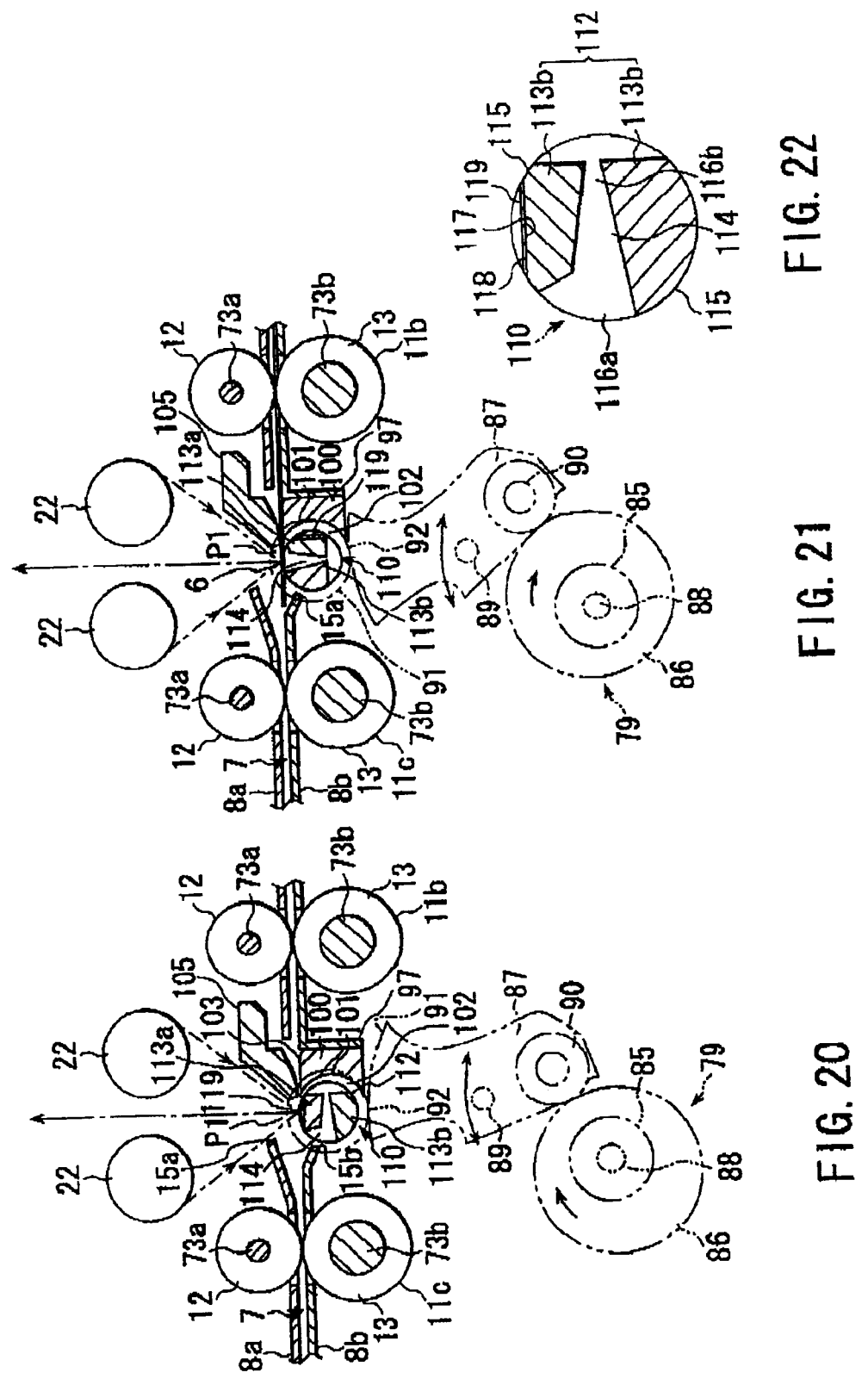

As is best shown in FIG. 22, the respective opposite surfaces of the first and second shaft bodies 113a and 113b that face the through hole 114 are inclined so as to approach each other with distance from the one opening 116a. Thus, the width of the one opening 116a is greater than that of the other opening 116b. The thickness of each of the first and second shaft bodies 113a and 113b increases as the other opening 116b is approached. Thus, the shaft portion 112 can secure a cross section wide enough in its diametrical direction, so that its deflection is restrained.

The outer peripheral surface 115 of the shaft portion 112 is curved in a circular arc. The outer peripheral surface 115 and the respective opposite surfaces of the first and second shaft bodies 113a and 113b that face the through hole 114 are blackened in order to lower the reflectance.

A part of the outer peripheral surface 115 of the shaft portion 112 forms a flat surface 117. The flat surface 117 extends in a straight line in the axial direction of first shaft body 113a. A white tape 118 is stuck on the flat surface 117. The tape 188 forms a white face 119 as a reference surface on the outer peripheral surface 115 of the shaft portion 112. The white face 119 extends in a straight line in the axial direction of the shaft portion 112.

The white reference element 110 is rockable between a first position in which the white face 119 is exposed to a reading position P1 by means of a drive mechanism 79 and a second position at an angular distance of about 90° in the clockwise direction from the first position. When the element 110 is in the first position as shown in FIG. 20, its white face 119 is situated flush with the transportation path 7, and light from fluorescent lamps 22 is applied to the surface 119. When the white reference element 119 is rocked to the second position as shown in FIG. 21, the white face 119 retreats into the space under the transportation path 7, and the sheet 6 passes over the surface 119. At the same time, the white face 119 of the element 110 gets into a gap 102 between a cover 100 and a recess 101 and is concealed from the outside by means of the cover 100. As shown in FIG. 21, moreover, the through hole 114 of the white reference element 110 shifts its position to a vertical one such that the wider opening 116a is exposed to the reading position P1.

When the white reference element 110 is rocked to the first position in this arrangement, the light from the fluorescent lamps 22 is applied to its white face 119. As in the case of the first embodiment, therefore, a reference level based on the output signal of the CCD image sensor 21 is detected in the control element 23, and the output signal of the sensor 21 is corrected in accordance with this reference level.

When the correction of the output signal is finished, the white reference element 110 is rocked for about 90° in the clockwise direction by means of the drive mechanism 79, so that it moves from the first position to the second position. Thereupon, the white face 119 retreats into the space under the transportation path 7 and is concealed from the outside by means of the cover 100.

When the white reference element 110 is in the second position, the opening 116a of the through hole 114 is exposed to the transportation path 7, and the center of the opening 116a is aligned with the reading position P1. In this state, the sheets 6 stacked on the hopper table 3 are delivered to the transportation path 7, and the image information recorded on the surface of each sheet 6 is read in the same manner as in the fourth embodiment.

While the image information is being read from the sheet 6, the white reference element 110 is held in the second position, and its white face 119 is concealed by means of the cover 100. If any foreign matter, such as paper dust, scraps of paper, or dust adhering to the sheet 6, drops from it during the reading process, therefore, it cannot be easily guided to or caused to adhere to the white face 119.

While the image information is being read, the sheet 6 passes over the shaft portion 112 of the white reference element 110. As this is done, the opening 116a in the outer peripheral surface 115 of the shaft portion 112 is opposed to the reading position P1 on the transportation path 7. If any foreign matter drops from the sheet 6, therefore, it is guided through the opening 116a to the through hole 114, and is discharged through the hole 114 to the position under the element 110.

In consequence, foreign matter cannot remain on the black outer peripheral surface 115 of the shaft portion 112, so that there is no possibility of the CCD image sensor 21 mistaking it for the leading end of or image information on the sheet 6. Thus, errors in image information reading or sheet transportation cannot easily occur, so that satisfactory image information can be fetched steadily for a long period of time.

FIGS. 23 to 25 show a sixth embodiment of the invention.

The sixth embodiment differs from the fourth embodiment in the configuration for preventing foreign matter from adhering to a white reference element 121. The fourth and sixth embodiments share other basic configurations of the OCR 1.

The white reference element 121 is composed of a round solid rod 122 that has a circular outer peripheral surface 123. The rod 122 has a flat surface 124 formed on a part of the outer peripheral surface 123 and extending in a straight line in its axial direction. A white tape 125 is stuck on the flat surface 124. The tape 125 forms a white face 126 as a reference surface on the outer peripheral surface 123 of the rod 122. The white face 126 extends in a straight line in the axial direction of the rod 122. All the area of the outer peripheral surface 123 of the rod 122 except the white face 126 is blackened in order to lower the reflectance.

The white reference element 121 is supported on a main body 2 so as to be rockable between a first position in which the white face 126 is exposed to a reading position P1 and a second position at an angular distance of about 180° in the clockwise direction from the first position.

When the white reference element 121 is in the first position as shown in FIG. 23, the white face 126 is situated flush with the transportation path 7, and light from fluorescent lamps 22 is applied to the surface 126. When the element 121 is rocked from the first position to the second position as shown in FIG. 24, the white face 126 is kept facing downward under the path 7.

A drive mechanism 79 for rocking the white reference element 121 to the first or second position includes a driving gear 128 that is fixed to a motor shaft 88. The gear 128 is in mesh with an idle gear 129. The gear 129 is in mesh with a driven gear 130 that is fixed to one end of the round rod 122.

If the driving gear 128 is rotated counterclockwise by means of the motor shaft 88, the white reference element 121 rotates counterclockwise and is moved alternatively to the first or second position.

As shown in FIGS. 23 and 24, a bracket 132 is fixed to the lower surface of the second guide plate 8b. The bracket 132 extends to the space under the transportation path 7. The lower end portion of the bracket 132 is situated under the white reference element 121, and a brush supporter 133 is fixed to the lower end portion of the bracket 132. The brush supporter 133 is situated right under the element 121. A brush 134 for use as a cleaning element is attached to the brush supporter 133. The brush 134 extends in the axial direction of the element 121. The distal end of the brush 134 is in contact with the outer peripheral surface 123 of the round rod 122.

When the white reference element 121 is rocked to the first position in this arrangement, the light from the fluorescent lamps 22 is applied to its white face 126. As in the case of the fourth embodiment, therefore, a reference level based on the output signal of the CCD image sensor 21 is detected in the control element 23, and the output signal of the sensor 21 is corrected in accordance with this reference level.

When the correction of the output signal is finished, the white reference element 121 is rocked for about 180° in the counterclockwise direction by means of the drive mechanism 79, so that it moves from the first position to the second position. Thereupon, the white face 126 retreats into the space under the transportation path 7, and the outer peripheral surface 123 of the round rod 122 is exposed to the path 7. In this state, the sheets 6 stacked on the hopper table 3 are delivered to the path 7, and the image information recorded on the surface of each sheet 6 is read.

While the image information is being read from the sheet 6, the white face 126 of the white reference element 121 is kept facing downward under the transportation path 7. If any foreign matter, such as paper dust, scraps of paper, or dust adhering to the sheet 6, drops from it during the reading process, therefore, it cannot be guided to or caused to adhere to the white face 126.

While the image information is being read, the sheet 6 passes over the outer peripheral surface 123 of the white reference element 121, as shown in FIG. 24. If any foreign matter, such as paper dust or scraps of paper, is then on the sheet 6, it may possibly transfer to the outer peripheral surface 123 of the element 121. When the reading process for the sheet 6 is finished, the element 121 is caused to make one revolution in the clockwise direction by means of the drive mechanism 79. Consequently, the distal end of the brush 134 touches the outer peripheral surface 123 of the element 121, whereupon the foreign matter transferred to the outer peripheral surface 123 of the element 121 is automatically rubbed off by means of the distal end of the brush 134.

Consequently, foreign matter cannot remain on the black outer peripheral surface 123, so that there is no possibility of the CCD image sensor 21 mistaking it for the leading end of or image information on the sheet 6. Thus, errors in image information reading or sheet transportation cannot easily occur, so that satisfactory image information can be fetched steadily for a long period of time.

As the white reference element 121 makes one revolution, moreover, the white face 126 reaches the first position, and the light from the fluorescent lamps 22 is applied to the white face 126. Thus, the foreign matter can be compulsorily removed from the outer peripheral surface 123, and the output signal of the CCD image sensor 21 can be corrected.

As the white face 126 of the white reference element 121 moves from the second position to the first position, according to the arrangement described above, furthermore, the white face 126 gets into a recess 101 of a cover 100 and is concealed by means of the cover 100. Before the downwardly facing white face 126 is exposed to the reading position P1 on the transportation path 7, therefore, foreign matter cannot easily adhere to the white face 126. Thus, the necessary reference level for the correction of the output signal of the CCD image sensor 21 can be fetched steadily.

Since the white face 126 cannot be easily soiled, moreover, it does not require frequent cleaning, so that the maintenance of the white reference element 121 is easy.

Figure 26:
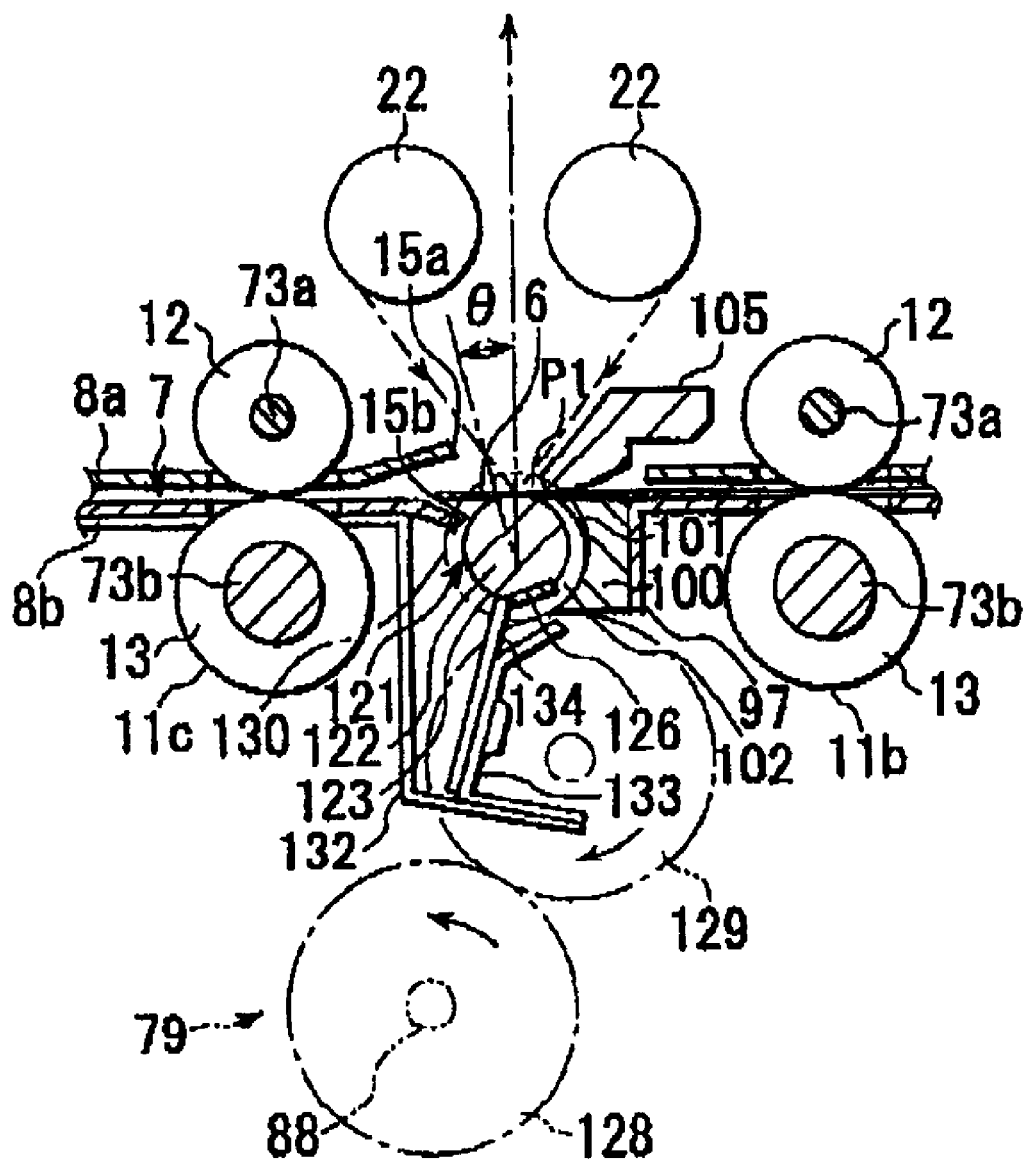
FIG. 26 is a sectional view showing a white face of a white reference element according to a seventh embodiment of the invention situated in its second position.

FIG. 26 shows a seventh embodiment of the invention.

The seventh embodiment is an advanced form of the sixth embodiment, and shares the basic configurations of the OCR 1 with the sixth embodiment.

The black outer peripheral surface 123 of the white reference element 121 is exposed to the transportation path 7 before the sheet 6 reaches the reading position P1. If any foreign matter, failing to be removed by means of the brush 134, exists on the outer peripheral surface 123 that is exposed to the transportation path 7 immediately before the reading position P1 is reached by the sheet 6, therefore, the CCD image sensor 21 may possibly mistake it for the leading end of or image information on the sheet 6.

In a reading unit 17 according to the present embodiment, however, whether or not the image information on the sheet 6 guided to the CCD image sensor 21 is abnormal is watched as the image information is read with the outer peripheral surface 123 of the white reference element 121 exposed to the transportation path 7.

More specifically, if any foreign matter adheres to the black outer peripheral surface 123, it may be mistaken for the leading end of the sheet 6 and define a reading range for the sheet 6 although the reading position P1 is not reached by the sheet 6. Accordingly, the control element 23 that receives the output signal of the CCD image sensor 21 detects an error such that the region to be read is deviated from the area of the sheet 6 to be read or that the sheet 6 is deviated from its right position on the transportation path 7.

If the error is detected, the control element 23 delivers a control signal to the motor 85 of the drive mechanism 79, whereupon the white reference element 121 is rocked to a position such that the foreign matter on the outer peripheral surface 123 is off the reading position P1, as indicated by the angle θ in FIG. 26. If the reading process is executed again in this state, therefore, the image information on the sheet 6 can be read accurately.

According to the seventh embodiment, the white reference element 121 may alternatively be caused to make one revolution about its axis without executing the reading process for the sheet 6 when an error is detected by means of the control element 23. If this is done, foreign matter adhering to the outer peripheral surface 123 of the element 121 can be removed again by means of the brush 134.

In carrying out the present invention, the recording media to be subjected to the reading process are not limited to sheets, and may alternatively be documents that carry image information such as characters.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus comprising:
   a transportation path for transporting a sheetlike recording medium, the transportation path having a reading position through which the recording medium passes;
   a reading unit for optically reading image information recorded on the recording medium, the reading unit including a light source for applying light to the reading position and a light sensor for receiving reflected light from the reading position and converting the received light into an electrical output signal to be outputted; and
   a correcting mechanism for correcting the output signal of the light sensor in accordance with a reference level, the correcting mechanism including a reference element having a reference surface for setting the reference level, the reference element being lockable between a first position in which the reference element is advanced to scan the reference surface and a second position in which the reference element is retreated from the reading position, and a drive mechanism including a rotating member interlocked with the reference element and capable of continuously rotating the rotating member in one direction, thereby rocking the reference element between the first and second positions.

2. An image reading apparatus according to claim 1, wherein said reference element is rocked from the second position to the first position every time the image information on the recording medium is read.

3. An image reading apparatus according to claim 1, wherein said rotating member is a plate cam having a cam surface on the outer peripheral edge thereof, said drive mechanism includes a motor for continuously rotating the plate cam in the one direction, and said reference element is rockable between the first and second positions in accordance with the shape of the cam surface of the plate cam.

4. An image reading apparatus according to claim 3, wherein said correcting mechanism includes a support mechanism for supporting the reference element, the support mechanism including a cam follower in contact with the plate cam.

5. An image reading apparatus comprising:
   a transportation path for transporting a sheetlike recording medium, the transportation path having a reading position through which the recording medium passes;
   a reading unit for optically reading image information recorded on the recording medium, the reading unit including a light source for applying light to the reading position and a light sensor for receiving reflected light from the reading position and converting the received light into an electrical output signal to be outputted; and
   a correcting mechanism for correcting the output signal of the light sensor in accordance with a reference level, the correcting mechanism including a reference element having a reference surface for setting the reference level, the reference element being rockable between a first position in which the reference element is advanced to scan the reference surface and a second position in which the reference element is retreated from the reading position, and a drive mechanism including a cam interlocked with the reference element and a motor for continuously rotating the cam in one direction and adapted to rock the reference element between the first and second positions as the cam rotates.

6. An image reading apparatus according to claim 5, wherein said cam has a first cam surface for rocking to and holding the reference element in the first position and a second cam surface for rocking to and holding the reference element in the second position.

7. An image reading apparatus according to claim 6, wherein said first cam surface is in the shape of a circular arc concentric with the center of rotation of the cam.

8. An image reading apparatus according to claim 5, wherein said cam has a pair of first cam surfaces for rocking to and holding the reference element in the first position and a pair of second cam surfaces for rocking to and holding the reference element in the second position, the first and second cam surfaces being arranged alternately in the rotating direction of the cam.

9. An image reading apparatus according to claim 5, further comprising a cover adapted to spread over the reference surface when the reference element is rocked to the second position.

10. An image reading apparatus comprising:
    a transportation path for transporting a sheetlike recording medium, the transportation path having a reading position through which the recording medium passes;
    a reading unit for optically reading image information recorded on the recording medium, the reading unit including a light source for applying light to the reading position and a light sensor for receiving reflected light from the reading position and converting the received light into an electrical output signal to be outputted;
    a correcting mechanism for correcting the output signal of the light sensor in accordance with a reference level, the correcting mechanism including a reference element having a reference surface for setting the reference level, the reference element being rockable between a first position in which the reference surface is advanced to scan the reference surface and a second position in which the reference surface is retreated under the reading position, and a drive mechanism including a rotating member interlocked with the reference element and capable of continuously rotating the rotating member in one direction, thereby rocking the reference element between the first and second positions; and a cover adapted to spread over the reference surface when the reference element is rocked to the second position.

11. An image reading apparatus according to claim 10, wherein said rotating member is a plate cam having a cam surface on the outer peripheral edge thereof, said drive mechanism includes a motor for continuously rotating the plate cam in the one direction, and said reference element is rockable between the first and second positions in accordance with the shape of the cam surface.

12. An image reading apparatus according to claim 10, wherein said reference surface of the reference element is white and serves to correct the output signal of the light sensor for uniformity.

13. An image reading apparatus comprising:

a transportation path for transporting a sheetlike recording medium, the transportation path having a reading position through which the recording medium passes;

a reading unit for optically reading image information recorded on the recording medium, the reading unit being capable of applying light to the reading position and converting reflected light from the reading position into an electrical output signal to be outputted;

a reference element having a reference surface for correcting the output signal of the reading unit for uniformity, the reference element being rockable between a first position in which the reference surface is advanced to the reading position to receive the light from the reading unit and a second position in which the reference surface is retreated under the reading position when the reading unit reads the image information on the recording medium; and a cover adapted to spread over the reference surface when the reference element is rocked to the second position.

14. An image reading apparatus according to claim 13, wherein said cover has a recess curved in the shape of a circular arc along the course of the rocking motion of the reference element, and said reference surface of the reference element gets into the recess when the reference element is rocked to the second position.

15. An image reading apparatus according to claim 13, wherein said transportation path includes a guide plate for guiding the recording medium in transportation, and said cover has a guide surface continuous with the guide plate and capable of guiding the recording medium in transportation.

16. An image reading apparatus according to claim 13, wherein said reference element is in the form of a rod extending at right angles to the direction of transportation of the recording medium.

17. An image reading apparatus according to claim 16, wherein the whole outer peripheral surface of said reference element except the reference surface is blackened, and that part of the outer peripheral surface of said reference element which is advanced to the reading position when the reference element is rocked to the second position forms a slope inclined at a downward angle to the transportation path.

18. An image reading apparatus according to claim 17, wherein said reference element includes an angle portion defined between the outer peripheral surface and the slope thereof, the angle portion being adapted to advance into the reading position to guide the recording medium in transportation when the reference element is rocked to the second position.

19. An image reading apparatus according to claim 16, wherein said reference element includes a through hole having a slit-shaped opening in the outer peripheral surface thereof in a position off the reference surface, the through hole being adapted to extend in the vertical direction and have the opening thereof exposed to the reading position when the reference element is rocked to the second position.

20. An image reading apparatus comprising;

a transportation path for transporting a sheetlike recording medium, the transportation path having a reading position through which the recording medium passes;

a reading unit for optically reading image information recorded on the recording medium, the reading unit being capable of applying light to the reading position and converting reflected light from the reading position into an electrical output signal to be outputted;

a reference element for correcting the output signal of the reading unit in accordance with a reference level, the reference element having an outer peripheral surface and a reference surface continuous to the outer peripheral surface, for setting the reference level and rockable between a first position in which the reference surface is advanced to the reading position to receive the light from the reading unit and a second position in which the reference surface is retreated under the reading position when the reading unit reads the image information on the recording medium;

a drive mechanism for rotating the reference element alternatively to the first or second position; and a cleaning element located around the reference element and adapted to come slidably into contact with the outer peripheral surface and the reference surface when the reference element is rotated.

21. An image reading apparatus according to claim 20, further comprising a cover adapted to spread over the reference surface when the reference element is rocked to the second position.

22. An image reading apparatus according to claim 21, wherein said cleaning element is located on the opposite side of the reference element to the transportation path, and said cover is located between the reference element and the transportation path.

23. An image reading apparatus according to claim 20, wherein said outer peripheral surface of the reference element advances into the reading position when the reading unit reads the image information on the recording medium, and the reading unit causes the drive mechanism to rotate the reference element, thereby shifting the position of the outer peripheral surface of the reference element with respect to the reading position, if data indicative of the read image information is abnormal.

* * * * *

UNITED STATES PATENT AND TRADEMARK OFFICE
CERTIFICATE OF CORRECTION

PATENT NO. : 6,989,915 B2
DATED : January 24, 2006
INVENTOR(S) : Honjo et al.

It is certified that error appears in the above-identified patent and that said Letters Patent is hereby corrected as shown below:

<u>Title page,</u>
Item [75], Inventors, delete ", jpx".

<u>Column 26,</u>
Line 13, change "comprising;" to -- comprising: --.

Signed and Sealed this

Eleventh Day of April, 2006

JON W. DUDAS
*Director of the United States Patent and Trademark Office*